United States Patent
Woodgate et al.

(10) Patent No.: US 8,917,441 B2
(45) Date of Patent: Dec. 23, 2014

(54) OBSERVE TRACKING AUTOSTEREOSCOPIC DISPLAY

(71) Applicant: RealD Inc., Beverly Hills, CA (US)

(72) Inventors: Graham J. Woodgate, Henley on Thames (GB); Michael G. Robinson, Boulder, CO (US); Jonathan Harrold, Leamington Spa (GB)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/939,053

(22) Filed: Jul. 10, 2013

(65) Prior Publication Data

US 2014/0022619 A1 Jan. 23, 2014

Related U.S. Application Data

(60) Provisional application No. 61/674,735, filed on Jul. 23, 2012, provisional application No. 61/709,051, filed on Oct. 2, 2012.

(51) Int. Cl.
| | |
|---|---|
| G02B 27/22 | (2006.01) |
| G02F 1/29 | (2006.01) |
| G02B 27/00 | (2006.01) |
| G02F 1/01 | (2006.01) |
| G02F 1/13 | (2006.01) |

(52) U.S. Cl.
CPC ........ *G02B 27/2214* (2013.01); *G02B 27/0093* (2013.01); *G02F 1/13* (2013.01); *G02F 1/29* (2013.01); *G02F 1/01* (2013.01)
USPC .......................................... 359/298; 359/463

(58) Field of Classification Search
CPC .. G02B 27/2214; G02B 27/0093; G02F 1/01; G02F 1/13; G02F 1/29
USPC ........................................ 359/240, 298, 463
See application file for complete search history.

(56) References Cited

U.S. PATENT DOCUMENTS

| | | |
|---|---|---|
| 5,959,664 A | 9/1999 | Woodgate |
| 6,014,164 A | 1/2000 | Woodgate et al. |

(Continued)

FOREIGN PATENT DOCUMENTS

| | | |
|---|---|---|
| EP | 0939273 | 1/1999 |
| EP | 0860729 B1 | 7/2006 |

(Continued)

OTHER PUBLICATIONS

NPL—International Search Report for copending PCT Application No. PCT/US2013/049969, prepared on Oct. 23, 2013.*

(Continued)

*Primary Examiner* — David N Spector
(74) *Attorney, Agent, or Firm* — Darlene K. Kondo; Neil G. J. Mothew

(57) ABSTRACT

A spatially multiplexed autostereoscopic display is arranged to provide landscape and portrait operation. Multiple optical windows may be provided by spatial and temporal multiplexing techniques. A fast response lens array pair is aligned with a fast response spatial light modulator, and synchronized to provide first and second sets of images with first and second respective directionalities to provide first and second sets of respective optical windows. The first and second sets of optical windows may each comprise two or more optical windows in each viewing lobe. The optical windows may be arranged with an inclination to the vertical of 25 degrees to 65 degrees. An observer tracking system may be arranged to direct left and right eye image data to the left and right eyes of an observer, respectively, for landscape and portrait orientations of the display.

32 Claims, 33 Drawing Sheets

(56) References Cited

U.S. PATENT DOCUMENTS

| | | | |
|---|---|---|---|
| 6,061,489 A | 5/2000 | Ezra et al. | |
| 6,075,557 A | 6/2000 | Holliman et al. | |
| 6,108,059 A | 8/2000 | Yang | |
| 6,199,995 B1 | 3/2001 | Umemoto | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,058,252 B2 | 6/2006 | Woodgate | |
| 7,073,933 B2 | 7/2006 | Gotoh et al. | |
| 7,101,048 B2 | 9/2006 | Travis | |
| 7,215,415 B2 | 5/2007 | Maehara | |
| 7,215,475 B2 * | 5/2007 | Woodgate et al. | 359/624 |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,660,047 B1 | 2/2010 | Travis et al. | |
| 7,750,981 B2 | 7/2010 | Shestak | |
| 7,750,982 B2 | 7/2010 | Nelson | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,216,405 B2 | 7/2012 | Emerton | |
| 8,354,806 B2 | 1/2013 | Travis | |
| 8,477,261 B2 | 7/2013 | Travis | |
| 2003/0137738 A1 | 7/2003 | Ozawa et al. | |
| 2004/0170011 A1 | 9/2004 | Kim et al. | |
| 2005/0264717 A1 | 12/2005 | Chien et al. | |
| 2006/0139447 A1 | 6/2006 | Unkrich | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0115552 A1 | 5/2007 | Robinson et al. | |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0140656 A1 | 6/2009 | Kohashikawa et al. | |
| 2009/0160757 A1 | 6/2009 | Robinson | |
| 2009/0225380 A1 | 9/2009 | Schwerdtner et al. | |
| 2010/0053771 A1 | 3/2010 | Travis | |
| 2010/0091254 A1 | 4/2010 | Travis | |
| 2010/0177387 A1 | 7/2010 | Travis | |
| 2010/0188438 A1 | 7/2010 | Kang | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0300608 A1 | 12/2010 | Emerton et al. | |
| 2011/0032483 A1 | 2/2011 | Hruska et al. | |
| 2011/0044056 A1 | 2/2011 | Travis | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242298 A1 | 10/2011 | Bathiche | |
| 2011/0285927 A1 | 11/2011 | Schultz et al. | |
| 2012/0127573 A1 | 5/2012 | Robinson et al. | |

FOREIGN PATENT DOCUMENTS

| | | |
|---|---|---|
| EP | 2003394 | 12/2008 |
| JP | 08254617 A | 10/1996 |
| JP | 08340556 A | 12/1996 |
| JP | 2001093321 A | 4/2001 |
| JP | 2002049004 A | 2/2002 |
| JP | 2004319364 A | 11/2004 |
| JP | 2005135844 A | 5/2005 |
| JP | 2005183030 | 7/2005 |
| JP | 2006004877 | 1/2006 |
| JP | 2006031941 A | 2/2006 |
| JP | 2008204874 A | 9/2008 |
| KR | 1020030064258 | 7/2003 |
| KR | 1020110006773 A | 1/2011 |
| KR | 1020110017918 A | 2/2011 |
| KR | 1020110067534 A | 6/2011 |
| KR | 1020120048301 A | 5/2012 |

OTHER PUBLICATIONS

Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
Travis, et al. "Backlight for view-sequential autostereo 3D".
International search report and written opinion of international searching authority for co-pending PCT application No. PCT/US2013/041192 mailed Aug. 28, 2013.
International search report and written opinion of international searching authority for co-pending PCT application No. PCT/US2013/041619 mailed Aug. 27, 2013.
International search report and written opinion of international searching authority for co-pending PCT application No. PCT/US2013/041655 mailed Aug. 27, 2013.
International search report and written opinion of international searching authority for co-pending PCT application No. PCT/US2013/041703 mailed Aug. 27, 2013.
International search report and written opinion of international searching authority for co-pending PCT application No. PCT/US2013/041548 mailed Aug. 27, 2013.
International search report and written opinion of international searching authority for co-pending PCT application No. PCT/US2013/041683 mailed Aug. 27, 2013.
International search report and written opinion of international searching authority for co-pending PCT application No. PCT/US2013/041228 mailed Aug. 23, 2013.
International search report and written opinion of international searching authority for co-pending PCT application No. PCT/US2013/041235 mailed Aug. 23, 2013.
International search report and written opinion of international searching authority for co-pending PCT application No. PCT/US2013/041697 mailed Aug. 23, 2013.

* cited by examiner

OBSERVE TRACKING AUTOSTEREOSCOPIC DISPLAY

RELATED APPLICATIONS

This application claims priority to U.S. Patent App. No. 61/674,735, entitled "Observer tracking autostereoscopic display", filed Jul. 23, 2012 (RealD Ref: 335000), and to U.S. Patent App. No. 61/709,051, entitled "Observer tracking autostereoscopic display", filed Oct. 12, 2012 (RealD Ref: 335000A), the entireties of which are herein incorporated by reference.

TECHNICAL FIELD

This disclosure generally relates to an apparatus for directing light from a spatial light modulator and more specifically relates to autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

However, such displays have reduced spatial resolution compared to the native resolution of the spatial light modulator, and furthermore the structure of the viewing windows is determined by the pixel aperture shape and parallax component imaging function. Gaps between the pixels, for example, for electrodes, typically produce non-uniform viewing windows. Undesirably, such displays exhibit image flicker as an observer moves laterally with respect to the display and so limit the viewing freedom of the display. Such flicker can be reduced by defocusing the optical elements; however, such defocusing results in increased levels of image cross talk and increases visual strain for an observer.

BRIEF SUMMARY

It is desirable to increase the viewing freedom of an autostereoscopic display so that an observer's head position is constrained within a narrow angular range. Observer tracking can be used to increase the viewing freedom so that the directionality for each image is adjusted in correspondence with measured observer position. An electronic observer tracking autostereoscopic display can provide multiple viewing windows and direct the correct data to an observer based on their position in front of the display as described in U.S. Pat. No. 5,959,664, which is herein incorporated by reference, in its entirety. A lens array that can be arranged to switch at high speed can be provided by a fast optical switch and a passive birefringent lens array, as described in U.S. Pat. No. 7,058,252, which is herein incorporated by reference, in its entirety. Multiple 2D/3D switching birefringent lenses are described in U.S. Pat. No. 7,215,415, and temporally multiplexed birefringent lenses are described in U.S. Pat. No. 7,750,981, both of which are herein incorporated by reference.

According to the first aspect of the present invention, there is provided a display device for an autostereoscopic display apparatus, the display device comprising: a spatial light modulator comprising an array of pixels; a first lens array and a second lens array, each aligned with the spatial light modulator and operable to direct light from spatially multiplexed sub-arrays of pixels into an array of at least three optical windows in a window plane, the optical windows of the first lens array being spatially offset from the optical windows of the second lens array; and a lens switching arrangement capable of causing the lens arrays to switch between operation in a first mode in which the first lens array operates and the second lens array has substantially no optical effect and a second mode in which the first lens array has substantially no optical effect and the second lens array operates.

Such display devices may be operated to improve the spatial resolution as compared to an equivalent display device in which a single lens array directs light from spatially multiplexed sub-arrays of pixels into an array of at least three optical windows in a window plane. This is achieved by the provision of the a lens switching arrangement that is capable of causing the lens arrays to switch between operation in a first mode in which the first lens array operates and the second lens array has substantially no optical effect and a second mode in which the first lens array has substantially no optical effect and the second lens array operates. As a result of the optical windows of the first lens array being spatially offset from the optical windows of the second lens array operation of the lens switching apparatus can be used in improve the spatial resolution.

In one possible technique to achieve such operation, the display device may be incorporated into an autostereoscopic display apparatus that further comprises: a sensor system arranged to detect the position of an observer relative to the display device; and a control system arranged to control the lens switching arrangement to switch the lens arrays to cause temporally multiplexed operation in the first mode and second mode and synchronously to cause the display device to display left and right eye images on the sub-arrays of pixels so as to direct the left and right eye images to optical windows corresponding to the left and right eyes of the observer, in dependence on the detected position of the observer. Thus, such an autostereoscopic display apparatus improves spatial resolution by combining temporal and spatial multiplexing of the left and right eye images. Further image flicker during observer movement can be reduced as the number of optical windows has been increased, thus directing light with greater accuracy to the respective observer eyes.

According to a second aspect of the present invention, there is provided an observer tracking autostereoscopic display comprising: a first lens array and a second lens array; a lens switching apparatus arranged to switch the first lens array to operate in a first phase and the second lens array to operate in a second phase; a spatial light modulator arranged to display image data in first and second phases and comprising an array of pixels aligned with the first and second lens arrays; wherein the first lens array cooperates with the array of pixels to produce an array of at least three viewing windows, and the second lens array cooperates with the array of pixels to produce an array of at least three viewing windows; and wherein the first and second arrays of viewing windows are spatially interlaced.

The presently disclosed principles provide for an autostereoscopic display wherein multiple optical windows are provided by means of spatial and temporal multiplexing. A fast response pair of lens arrays is aligned with a fast response spatial light modulator, and synchronized to provide first and second sets of images with first and second respective directionalities to provide first and second sets of respective optical windows. The first and second sets of optical windows may each comprise two or more optical windows in each viewing lobe. The optical windows may be arranged with an inclination to the vertical of 25 degrees to 65 degrees, preferably 35 degrees to 55 degrees, and in advantageous embodiments substantially at 45 degrees. An observer tracking system may be arranged to direct left eye image data to the left eye of an observer, and right eye image data to the right eye of an observer, for landscape and portrait orientations of the display. Preferably the observer tracking system may be arranged to direct a single left eye image to the left eye and a single right eye image to the right eye for a given observer position.

According to a third aspect of the present invention, there is provided an autostereoscopic display apparatus, comprising: a display device comprising an array of pixels arranged in an aperture with a shape having two perpendicular axes of mirror symmetry and a parallax element arranged to direct light from spatially multiplexed sub-arrays of pixels into respective optical windows in a window plane having different positions and extending at an angle in a range from 25 to 65 degrees relative to an axis of the rectangular shape of the aperture; a sensor system arranged to detect the position of an observer in two dimensions across the display device and the orientation of the view of the observer; and a control system arranged to control the display device to display left and right eye images on the sub-arrays of pixels so as to direct the left and right eye images to optical windows corresponding to the left and right eyes of the observer, in dependence on the detected position of the observer and on the detected orientation of the view.

The third aspect of present invention benefits from selection of the angle at which the optical windows extend relative the axes of the shape of the aperture in which the pixels are arranged. A display device is most normally viewed with one of the axes of symmetry close to horizontal, that is in a landscape or portrait orientation in the case of rectangular aperture. Where the viewing windows extend along or close to an axis of symmetry, autostereoscopic display of images can only be provided when the display device is viewed with that axis of symmetry vertical, and not when the display device is rotated by 90 degrees so that the other axis of symmetry is vertical because then a single viewing window extends across both eyes of the viewer.

In contrast, in the third aspect of the present invention, the windows extend at an angle in a range around 45 degrees, for example from 25 to 65 degrees, more preferably 35 to 55 degrees, or 40 to 50 degrees. Such angled viewing windows may be used to provide autostereoscopic display of images in varied orientations of the display device, when controlled in dependence on a detected position of the observer and on a detected orientation of the view. In particular, since the angled windows are separated along both axes, left and right images can be directed to be displayed images in viewing windows in positions corresponding to the left and right eyes of the observer, when the display apparatus is viewed in orientations in which either axis is at or around vertical.

Embodiments herein may achieve an autostereoscopic display with large area and thin structure, a wide viewing angle, high resolution in 2D and 3D modes, low cross talk, landscape and portrait viewing geometries, no moving parts, low cost, and high efficiency and brightness. Such a display may be particularly well suited to single viewer displays. Text and graphical information may be presented with high image fidelity.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

The different aspects of the present invention may be used together in a single embodiment and the various optional features of those aspects may be combined together in any combination.

Before proceeding to the disclosed embodiments in detail, it should be understood that the disclosure is not limited in its application or creation to the details of the particular arrangements shown because the disclosure is capable of other embodiments. Moreover, aspects of the disclosure may be set forth in different combinations and arrangements to define embodiments unique in their own right. Also, the terminology used herein is for the purpose of description and not of limitation. These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

Time multiplexed autostereoscopic displays can advantageously improve the spatial resolution of an autostereoscopic display by directing light from all of the pixels of a spatial light modulator to a first viewing window in a first time slot, and all of the pixels to a second viewing window in a second time slot. Thus, an observer with eyes arranged to receive light in first and second viewing windows will see a full resolution image across the whole of the display over multiple time slots.

Figure 1A:
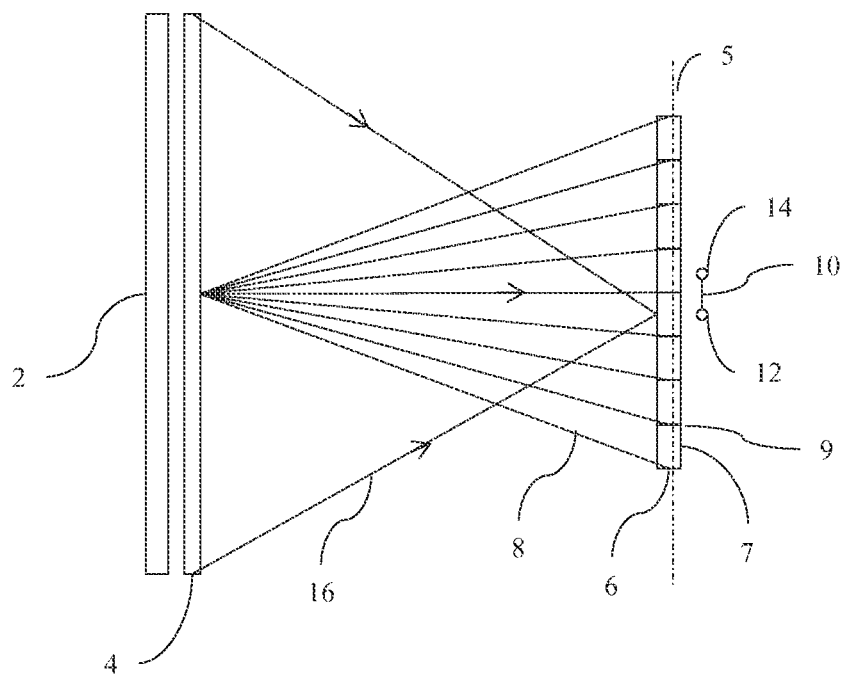
FIG. 1A is a schematic diagram illustrating a top view of light propagation from an autostereoscopic display, in accordance with the present disclosure.

FIG. 1A is a schematic diagram illustrating a top view of light ray 8, 16 propagation from an autostereoscopic display comprising a spatial light modulator (SLM) 2 comprising an array of pixels arranged in an aperture that has a rectangular shape (as described further below). The SLM 2 is provided with a spatially multiplexing parallax optic 4, such as a parallax barrier or lenticular screen, and arranged to direct rays 8 of light from spatially multiplexed sub-arrays of pixels to an array 6 of optical windows comprising nominal window regions 7 separated by boundary regions 9. Regions 9 may be sharp boundaries of intensity profile, but more typically may be a position at which the intensity of a first window is the same as the intensity of an adjacent window as will be described below. An observer 10 with left eye 12 and right eye 14 is positioned at or near the window plane 5 of the windows 6 so that light rays 16 from the display mean that substantially a single image is seen across the whole of the display 2, 4 for the observer's left eye 12. Similarly the right eye 14 sees a right eye image across the whole of the display 2, 4 so that if appropriate image data is arranged on the spatial light modulator 2, then a stereoscopic image is perceived by the observer 10.

Figure 1B:
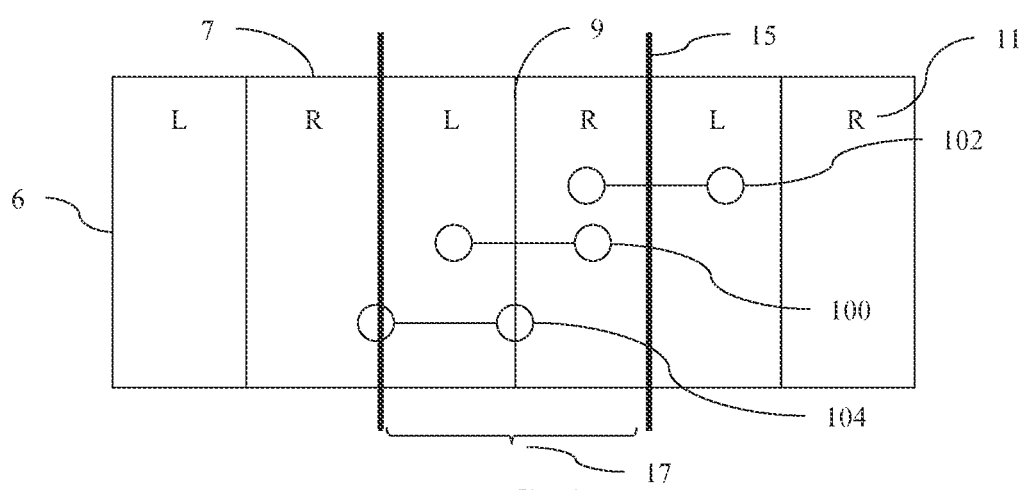
FIG. 1B is a schematic diagram illustrating a front view of an array of viewing windows, in accordance with the present disclosure.

FIG. 1B is a schematic diagram illustrating a front view of an array 6 of optical windows for a two view autostereoscopic display. In this example, the optical windows extend parallel to one of the axes of mirror symmetry of the rectangular shape of the aperture (which is vertical in FIG. 1B) and the SLM 2 is intended to be viewed in an orientation with that axis of mirror symmetry vertical. Each of the optical windows are arranged as viewing windows to comprise left and right eye image data 11 and may be arranged as repeating lobes 17 separated by lobe boundaries 15. An observer 10 with position 100 will see an orthoscopic 3D image, while an observer at position 102 will see a pseudoscopic image, which may cause visual discomfort. An observer at position 104 will see the transition regions between left and right eye optical windows 7 and will thus see high cross talk and typically reduced intensity. Such a display has limited viewing freedom and is difficult to provide observer tracking to increase viewing freedom without providing some movement of the windows. Such movement can be achieved by adjusting the position of the spatially multiplexed parallax optic 4, for example, by mechanical movement, although such arrangements may be expensive and may suffer from increased cross talk in comparison to the presently disclosed principles.

Figure 1C:
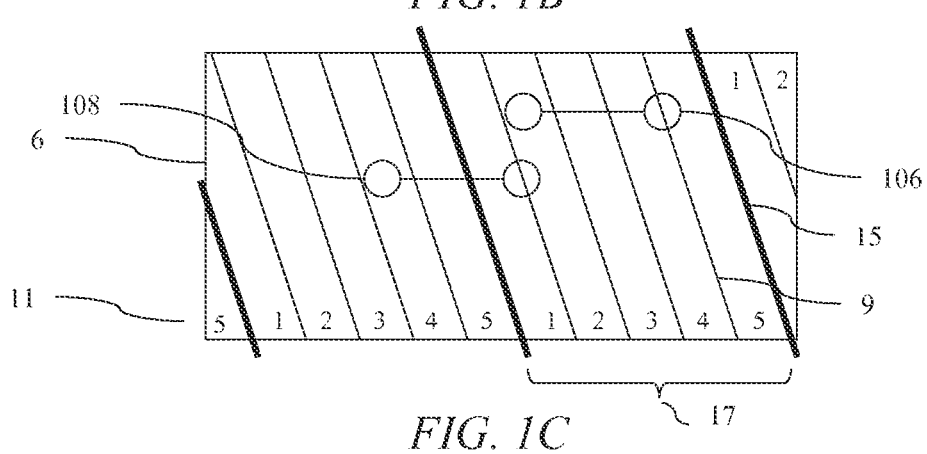
FIG. 1C is a schematic diagram illustrating a front view of an array of viewing windows, in accordance with the present disclosure.

FIG. 1C is a schematic diagram illustrating a front view of an array 6 of optical windows 7. The windows 7 and lobes 17 are tilted at a small angle (such as 18.4 degrees in a known five view display) relative to the axis of mirror symmetry of the rectangular shape of the aperture that is vertical in the orientation of the SLM 2 in which it is intended to be viewed. More than two windows 7 are provided in a single lobe 17. In one arrangement, the data 11 of optical windows 1 to 5 may be set to be different perspectives of a scene such that as an observer moves, the window data may be modified. However, such a system requires multiple view data, which can be difficult to produce compared to commonly available two view stereoscopic data. Further, the viewing freedom of such a display is limited to less than the size of the lobe 17. Also, such an arrangement can suffer from blur between adjacent images if a uniform intensity profile across the window plane is required to reduce image flicker for a moving observer.

It would be desirable to increase the freedom of an observer while providing two sets of image data and low levels of image flicker. This can be achieved by adjusting the image data 11 presented to the SLM 2 in correspondence with a measured observer position, as follows.

In an image data tracking system, an observer at position 106 will see an orthoscopic image if windows 4 and 5 comprise right eye image data and windows 1, 2 and 3 comprise left eye image data. Similarly, an observer at position 108 may see an orthoscopic image if windows 1 and 2 comprise right eye image data 11 and windows 3, 4 and 5 comprise left eye image data. In this manner, a moving observer may maintain the appearance of an orthoscopic image for a range of viewing positions by means of adjustment of the data presented to the SLM 2. Further, the observer may be tracked across the window lobe boundaries 15 while maintaining an orthoscopic image.

Figure 1D:
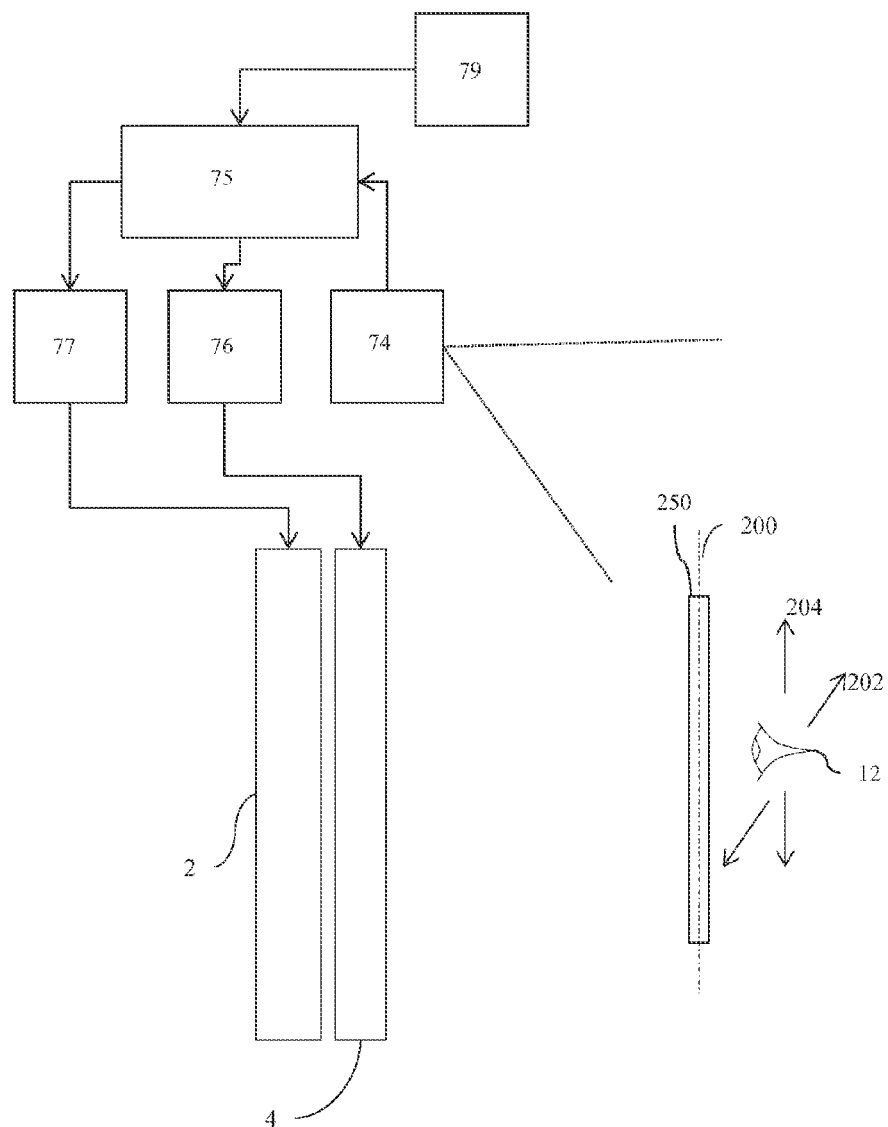
FIG. 1D is a schematic diagram illustrating a side view of an observer tracking autostereoscopic display system, in accordance with the present disclosure.

FIG. 1D is a schematic diagram illustrating a side view of an observer tracking autostereoscopic display system comprising an SLM 2 provided with a spatially multiplexing parallax optic 4. In operation, an observer tracking system 74 including a sensor such as a camera in cooperation with a computer vision processing system may be arranged to detect the position of an observer 12 of an observer in two dimensions across the display device near to the window plane 5.

An orientation sensor 79 may be used to detect the orientation of the view of the observer and thus to determine landscape or portrait operation of the LCD 48 in cooperation with the observer tracking system 74. Thus, the observer tracking system 74 and the orientation sensor 79 together form a sensor system that detects the position of an observer in two dimensions across the display device and the orientation of the view of the observer. Other types of sensor system could alternatively be provided to obtain this information. For example the observer tracking system 74 could determine both the position and orientation. In that case the orientation could be indicated directly or by indicating the position of both eyes of the viewer.

A control system is arranged as follows. A system controller 75 may be arranged to provide position data to a parallax optic 4 controller 76 and an SLM controller 77 in response to data from the system controller 75. The control system is arranged to control the display device as follows to display left and right eye images on sub-arrays of pixels of the SLM 2 so as to direct the left and right eye images to optical windows corresponding to the left and right eyes of the observer. In general, this control is performed in dependence on the detected position of the observer.

In the case of vertical optical windows, for example as shown in FIG. 1B, it is possible for the control to be performed in dependence on the detected position of the observer in one dimension horizontally across the SLM 2, but not on the vertical position, because the same optical windows are used irrespective of the vertical position. In the case of angled optical windows, for example as shown in FIG. 1C, the control is performed in dependence on the detected position of the observer in two dimensions across the SLM 2 to select the optical windows that correspond to the left and right eyes of the observer.

If the SLM 2 is viewed in an orientation in which the axis of symmetry of the rectangular shape intended to be vertical is in fact horizontal, then a single viewing window extends across both eyes of the viewer and so autostereoscopic display of images is not possible. The detected orientation of the view may optionally be used to check the viewer is viewer in the correct orientation.

The control system and display apparatus can thus achieve the desired illumination and image data to the respective left and right eyes of the observer for movements in horizontal 202 and vertical 204 directions in both landscape and portrait modes of operation The update response of an image data tracking system may be determined by the update response of the SLM 2. If the observer moves faster than the update rate of the SLM 2, then pseudoscopic images and increased cross talk may be present. It would be desirable to increase the window array 6 update rate. Further, such multi-window spatially multiplexed displays suffer from substantially reduced resolution in comparison with the SLM 2 resolution. It would be desirable to reduce resolution loss from the optic 4. Further, it would be desirable to provide a display that can be used in landscape and portrait modes for 3D operation.

Figure 2:
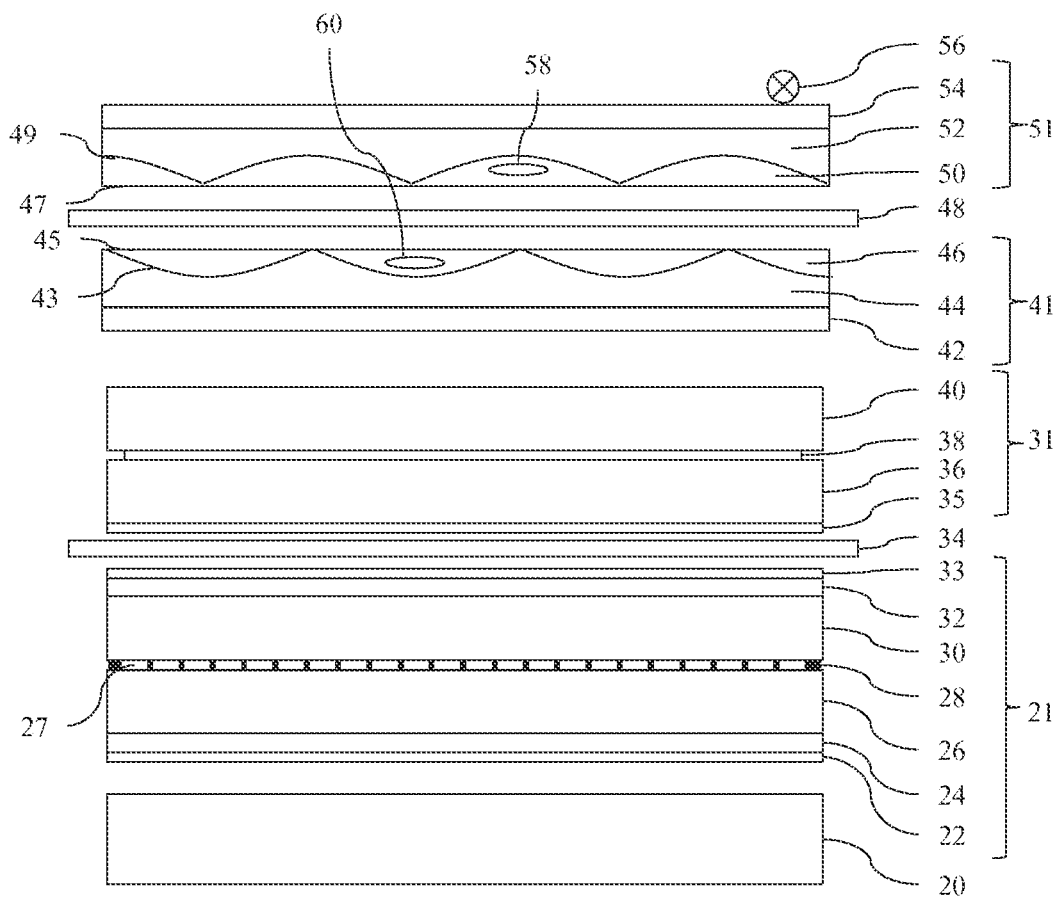
FIG. 2 is a schematic diagram illustrating a side view of a window switching 3D autostereoscopic display comprising tilted passive surface relief birefringent lenses, in accordance with the present disclosure.

FIG. 2 is a schematic diagram illustrating a side view of a window switching 3D autostereoscopic display comprising tilted passive surface relief birefringent lens arrays 41, 51. An SLM 2 comprises a backlight 20 and transmissive LCD 21, further comprising polarizer 22, optional waveplates 24, substrate 26, addressable pixel layer 28, substrate 30, optional waveplate 32 and polarizer 33. Thus, in this example the SLM 2 is a transmissive SLM, but more generally the SLM could be any type of device that outputs modulated light, including an emissive SLM or a reflective SLM.

An optional retarder 34 may be arranged to rotate the polarization state from polarizer 33 onto an input polarizer 35 of a fast response polarization switch 31. Switch 31 may further comprise substrate 35, 40 and a fast response retardation layer 38, such as a liquid crystal layer. Light from backlight 20 is thus incident on lens array 41 with first and second polarization states as will be described below.

There is provided a first lens array 41 and a second lens array 51 which are passive birefringent lens arrays, each aligned with the SLM 2 and operable to direct light from spatially multiplexed sub-arrays of pixels into an array of at least three, preferably at least five, optical windows in a window plane. Lens array 41 may comprise a substrate 42, an isotropic layer 44 with a lenticular surface relief structure 43 to a birefringent layer 46 further comprising a planar output surface 45. An optional retarder 48 may be provided between lens array 41 and lens array 51, wherein lens array 51 further comprises a birefringent layer 50 with planar surface 47 and lenticular surface relief structure 49 to an isotropic layer 52. An output substrate 54 may be provided with coatings, such as anti-reflective coatings 56 for example. The layers 46, 50 may comprise birefringent materials 60, 58, such as cured polymer liquid crystal materials, respectively, such that the refractive index of the isotropic material of layers 44, 52, respectively, may be the same as one of the indices of materials 60, 58. The lens arrays 41, 51 are arranged so that structures 43, 49 are aligned out of phase, that is the optical windows of the first lens array have the same pitch as the optical windows of the second lens array the optical windows, but are spatially offset from offset from the optical windows of the second lens array by half that pitch.

Figure 3:
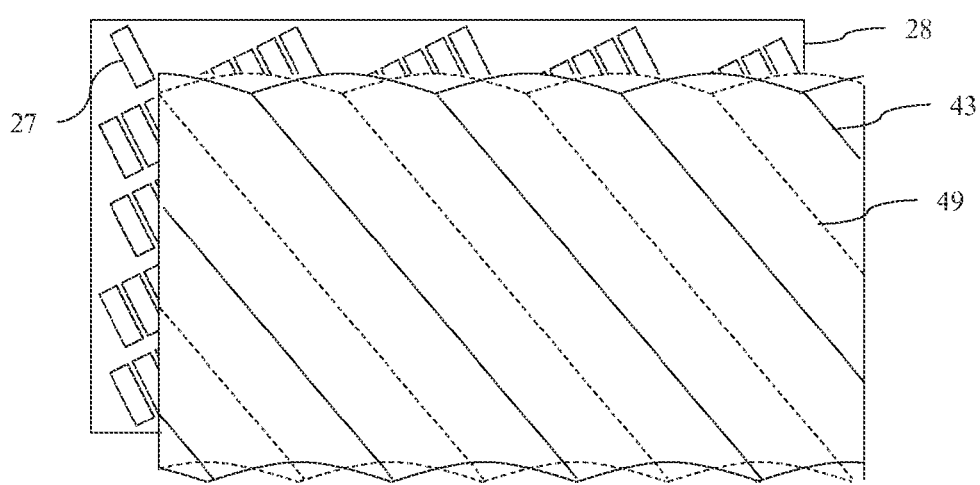
FIG. 3 is a schematic diagram illustrating a front view of a window switching 3D autostereoscopic display, in accordance with the present disclosure.

FIG. 3 is a schematic diagram illustrating a front view of a window switching 3D autostereoscopic display. Pixels 27 of layer 28 are arranged in alignment with first and second lens array structures 43, 49. As will be shown, in a first mode of operation, structure 49 and hence the second lens array 51 is arranged to have no optical function, while structure 43 and hence the first lens array 41 operates as a lenticular lens array.

In a second mode of operation, structure 49 and hence the second lens array 51 operates as a lenticular lens array, while structure 43 and hence the first lens array 41 has substantially no optical function.

Further, pixels 27 are arranged to provide a first set of image data in the first mode and a second set of image data in the second mode. The image data is selected to display left and right eye images on sub-arrays of pixels that are directed into viewing windows by the first and second lens arrays 41 and 51. The SLM 2 comprising elements 20, 21 may thus be provided with a high frame rate, for example, 120 Hz, which may be conveniently achieved with fast response liquid crystal displays or OLED displays. As will be shown, in operation such an arrangement can achieve increased image resolution and increased window density. Further, the display achieves multiple window arrays, thus achieving image data tracking operation with high update rate, reducing display flicker and reducing image cross talk.

Figure 4:
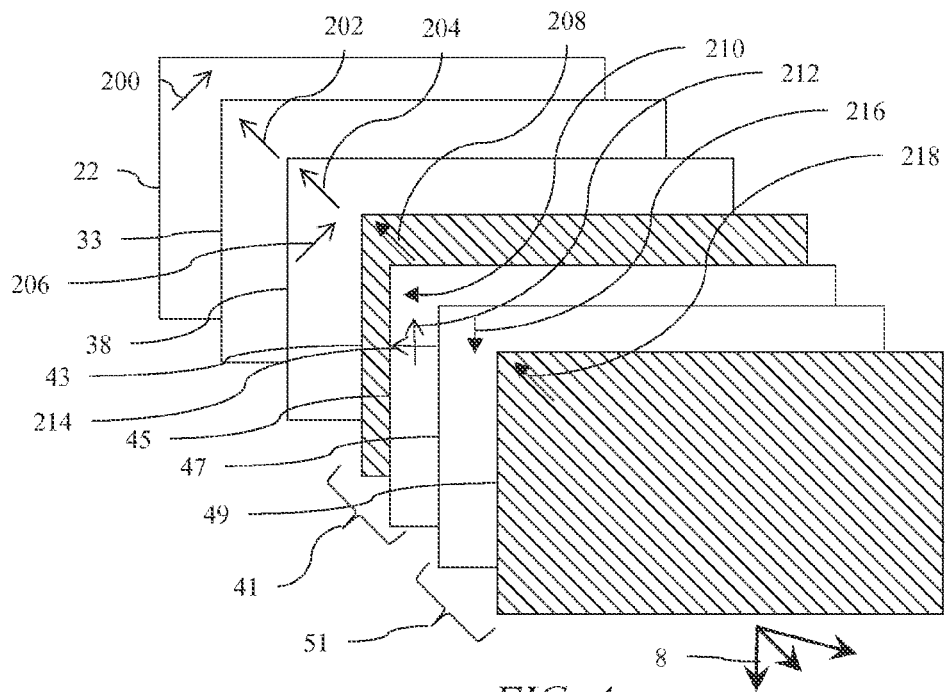
FIG. 4 is a schematic diagram illustrating a front view of optical layers in a window switching 3D autostereoscopic display comprising tilted birefringent lenses and a transmissive spatial light modulator, in accordance with the present disclosure.

The mode of operation of the first and second lens arrays 41 and 51 is controlled by the polarisation of light passing therethrough under the control of the polarisation switch 31 which therefore operates as a lens switching arrangement, as follows. FIG. 4 is a schematic diagram illustrating a front view of optical layers in a window switching 3D autostereoscopic display comprising tilted birefringent lenses and a transmissive spatial light modulator 2. For illustrative purposes, certain layers are omitted from the stack of layers. LCD 21 input polarizer 22 has a polarization transmission state 200, with output polarizer 33 having a polarization transmission state 202, where states 200, 202 may be substantially linear polarization states. Retarder 34 and polarizer 35 may be omitted so that light is incident on layer 38, whereon the output polarization direction is un-rotated to achieve output polarization state 204 in a first mode or is rotated to achieve output polarization state 206 in a second mode.

In the first mode, the state 204 is incident parallel to the birefringent material 60 extraordinary axis alignment direction 210 at the structure 43 so that there exists an index step at the structure 43 and the lens array 41 becomes optically functional. The alignment direction 212 at the plane surface 47 generates a polarization rotation within the layer 46 so that a polarization state 214 is output from lens array 41 in the first mode. This light is incident onto the plane surface of lens array 51 with alignment directions 216, 218 at surface 47 and structure 49, respectively. Thus, the state 214 is incident on the normal refractive index of the birefringent material 58 of the lens array 51, which is index matched to the isotropic material 52. Thus, the array 51 has substantially no optical function and the light is transmitted unmodified.

In the second mode of operation, the layer 38 outputs state 206, which is incident on the ordinary axis of birefringent material 60 of lens array 41 and on the extraordinary axis of birefringent material 58 of lens array 51. In this manner, in the second mode the first array 41 is substantially transparent and the second array 51 is optically functional as a lenticular screen arranged to produce a second set of multiple windows.

Thus, the polarisation switch 31 switches the polarisation of light output from the SLM 2 between polarisation states 204 and 206 that correspond to the polarisation components that are directed by the first and second lens arrays 41 and 51. In this manner the polarisation switch 31 selects the mode of operation of the first and second lens arrays 41 and 51.

In operation of the display apparatus, the control system controls the polarisation switch 31 to switch the lens arrays 41 and 51 to cause temporally multiplexed operation in the first mode and second mode. Synchronously, the control system causes the SLM 2 to display left and right eye images on the sub-arrays of pixels so as to direct the left and right eye images to optical windows corresponding to the left and right eyes of the observer.

In this display apparatus, the windows extend at an angle in a range around 45 degrees. The range may be, for example, from 25 to 65 degrees, more preferably 30 to 50 degrees, 35 to 55 degrees, or 40 to 50 degrees. The control system provides autostereoscopic display of images in varied orientations of the display device, by directing the left and right eye images to optical windows corresponding to the left and right eyes of the observer, in dependence on the detected position of the observer and on the detected orientation of the view, as detected by the sensor system as shown in FIG. 1D and described above. This is achieved by use of the angled optical windows, as described in more detail below.

Some alternative display apparatuses will now be described. In general these alternative apparatuses have the same construction and operate in the same manner as described above except for the modifications described below. For brevity, the same reference numerals are used for common elements and a description thereof is not repeated.

Figure 5:
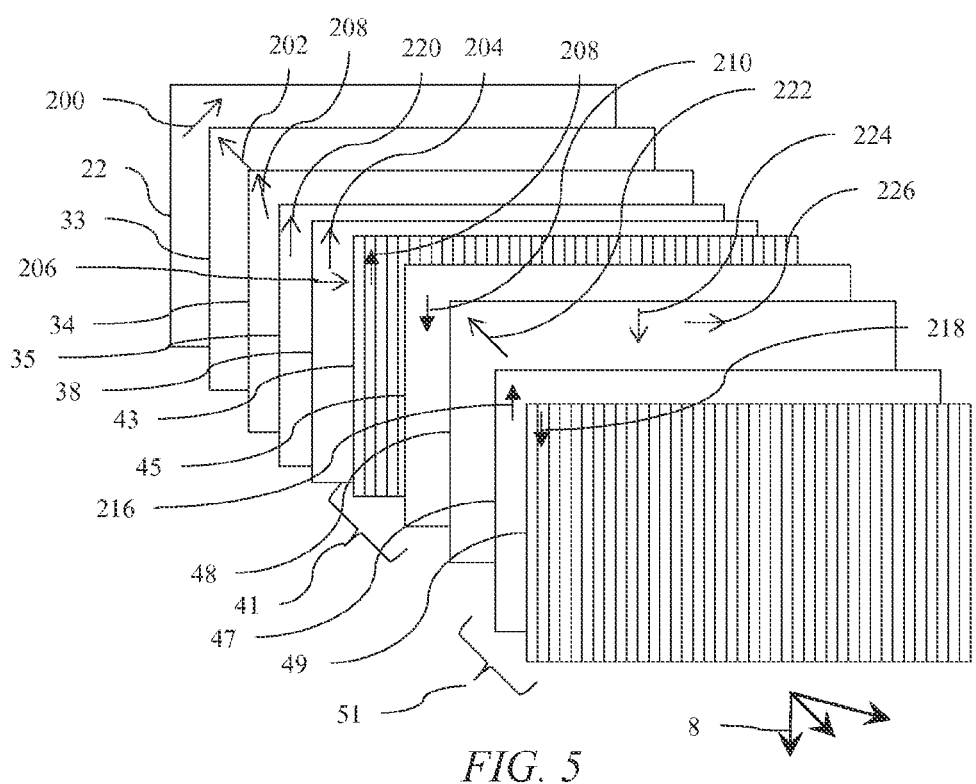
FIG. 5 is a schematic diagram illustrating a front view of optical layers in a window switching 3D autostereoscopic display comprising vertical birefringent lenses, in accordance with the present disclosure.

FIG. 5 is a schematic diagram illustrating a front view of optical layers in a window switching 3D autostereoscopic display comprising vertical birefringent lenses. In this embodiment, the output polarization state 202 is aligned in cooperation with the respective lens arrays. Retarder 34 may be a stack of retarders, such as a Pancharatnum stack arranged with an effective retardation direction 208 arranged to achieve rotation of the state 202 to a vertical state 220 incident on the input polarizer 35 of switch layer 38. The material alignment directions 210, 212, 216, 218 of the arrays 41, 51 may be arranged to operate in cooperation with an additional retarder layer 48 with effective retardation axis direction 222 so that the output polarization states from surface 45 are rotated through 90 degrees to achieve input states 224, 226 for array 51. Advantageously, the material 60, 58 of lens arrays 41, 51 can be aligned parallel to the groove directions of the respective arrays, reducing disclinations and increasing optical quality.

Figure 6A:
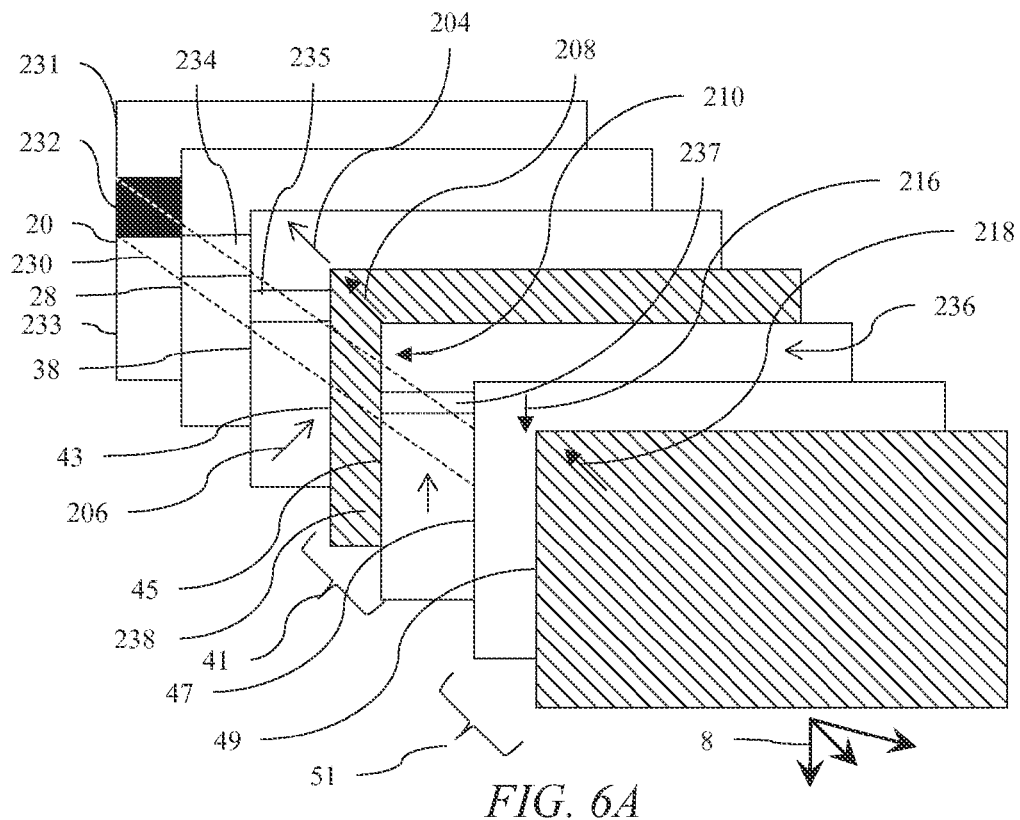
FIG. 6A is a schematic diagram illustrating a front view of optical layers in a window switching 3D autostereoscopic display comprising a scanning backlight, in accordance with the present disclosure.

FIG. 6A is a schematic diagram illustrating a front view of optical layers in a window switching 3D autostereoscopic display comprising a scanning backlight. Backlight 20 may comprise a first illumination region 231, a substantially non-illuminated region 232 and a further illumination region 233. Lines 230 schematically represent alignment between the respective layers. Regions 231, 232, 233 may be arranged as independently switchable regions of backlight 20 and may have phases that are adjustable between first and second modes. In operation, upper region of the pixel layer 28 is provided with image data for a first phase, region 234 is a pixel switching region and the lower region of layer 28 is provided with image data for a second phase. The region 234 advantageously is not illuminated during the pixel switching interval of the layer 28 and thus the cross talk of the display is reduced in operation. Further, the layer 38 may be patterned in alignment with the backlight 20 so that the output polarization state 204 from the upper region of the switch layer 38 is orthogonal to the output polarization state 206 from the lower part of the layer 38. In region 235 the layer 38 is arranged to switch retardance. Thus, the output polarization state incident on the arrays 41, 51 are different for top and bottom regions of the respective lens arrays, with a polarization switching region 237 between the regions. As the backlight 20 is not illuminated in region 232, region 237 will not be visible. By scanning the region 232 down the backlight in registration with the pixel layer 28 and switch layer 238, the output efficiency of the device can be increased, while reducing image cross talk.

Figure 6B:
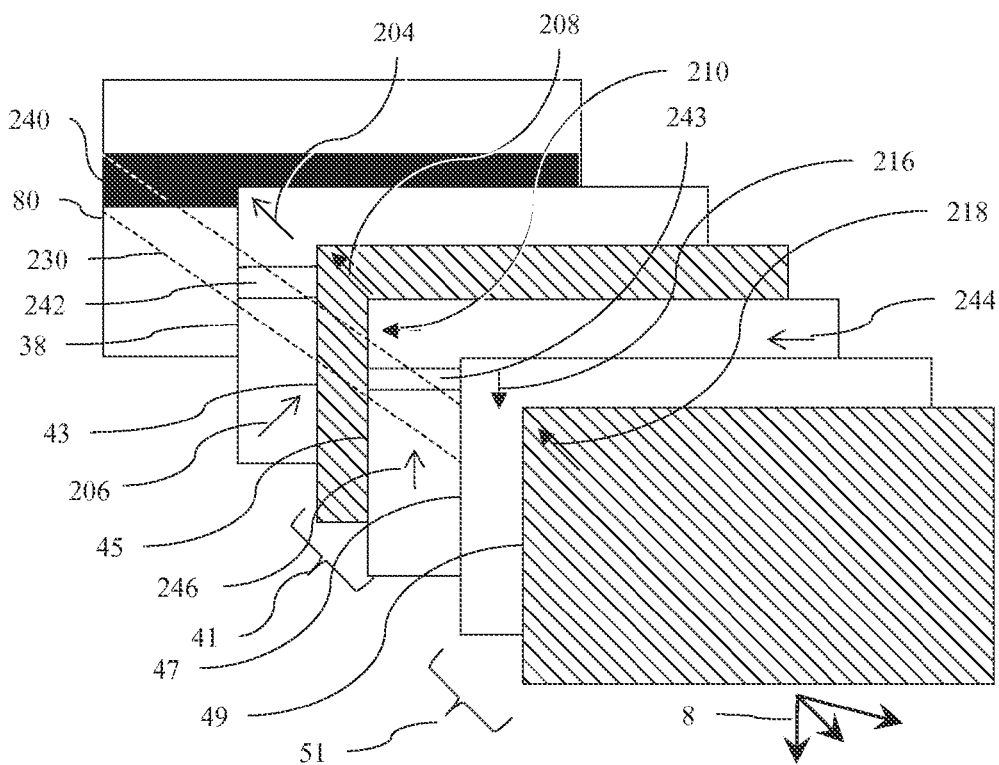
FIG. 6B is a schematic diagram illustrating a front view of optical layers in a window switching 3D autostereoscopic display comprising an emissive scanning spatial light modulator, in accordance with the present disclosure.

FIG. 6B is a schematic diagram illustrating a front view of optical layers in a window switching 3D autostereoscopic display comprising an emissive scanning spatial light modulator 80, such as an OLED display. The operation of this embodiment is similar to FIG. 6A, with the backlight 20 omitted. In region 240, OLED pixels are not illuminated so that the response speed of the layer 38 is not evident in the output of the display for the region 242. Similarly, the region 243 will be illuminated by light from region 242. However, such region 242 is substantially not illuminated due to the non-emitting pixels in region 240. Thus, polarization states 244, 246 are present between lens arrays 41 and 51. Typically regions 234, 235, 242 will be smaller than regions 232, 240 of the respective displays and may be extended to avoid parallax errors with the lens array 41, 51 layers. Advantageously, the display brightness may be increased and cross talk reduced during switching of layer 38.

The embodiments of FIGS. 2-6B advantageously provide increased resolution and window density. Such displays can be used to achieve a 2D display by providing substantially the same image data for left and right eyes.

Figure 7:
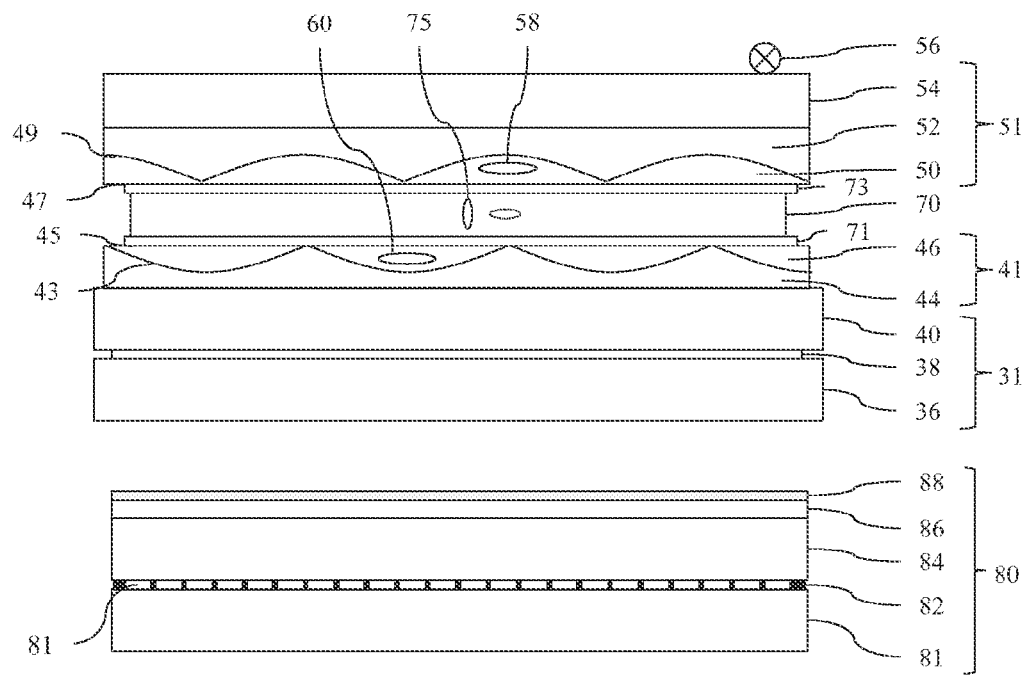
FIG. 7 is a schematic diagram illustrating a front view of a window switching 2D/3D autostereoscopic display comprising an emissive scanning spatial light modulator and passive surface relief birefringent lenses, in accordance with the present disclosure.

FIG. 7 is a schematic diagram illustrating a front view of a window switching 2D/3D autostereoscopic display comprising an emissive scanning spatial light modulator and passive surface relief birefringent lenses. It may be further desirable to achieve visibility of the full SLM 2 resolution in 2D mode of operation for a window switching autostereoscopic display. A spatial light modulator 2 may be provided by an emissive display 80, for example, an OLED display comprising substrate 81, addressable pixel layer 82 comprising pixels 81, a substrate 84, quarter waveplate 86 and polarizer 88. Birefringent lens arrays 41, 51 may each be further provided with electrodes and alignment layers 71, 73 on surfaces 45, 47, respectively, and a further switching liquid crystal layer 70 provided therebetween. Layer 70 may have a slow switching response speed and may thus not be a thin cell. Advantageously, layer 70 can be conveniently formed on surfaces 45, 47 that do not have the high flatness and parallelism that may be required for fast switching devices. Thus, layer 38 may advantageously have a fast response for switching between first and second mode lens operation for multi-window array operation, while layer 70 may have a slow response for switching between 2D and 3D modes of operation. Such layers can be conveniently manufactured at low cost. In operation, the liquid crystal material of layer 75 can be switched between first and second orientations.

Figure 8:
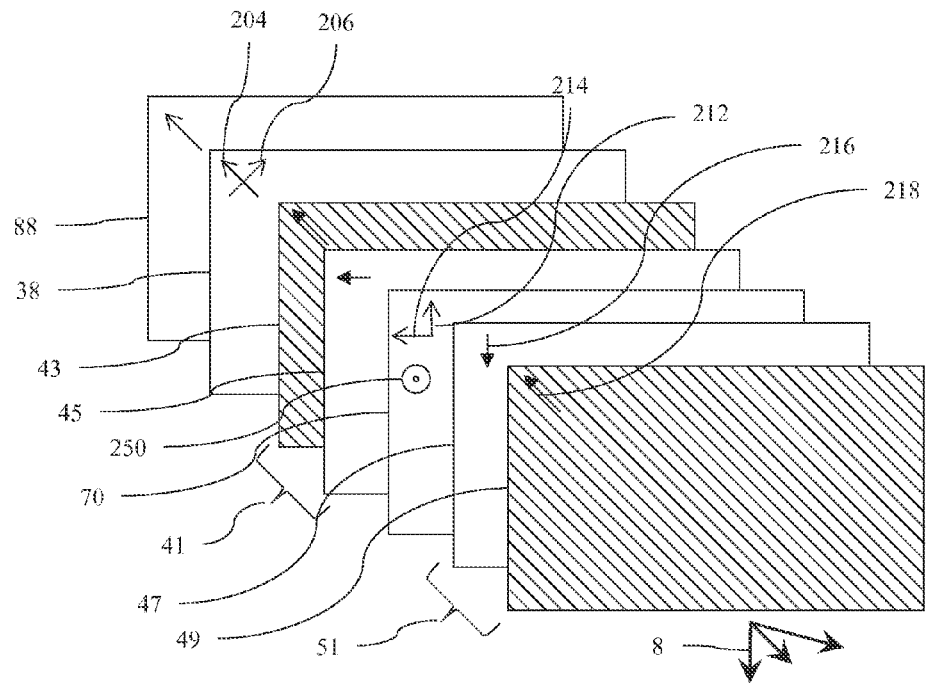
FIG. 8 is a schematic diagram illustrating a front view of optical layers in a window switching 2D/3D autostereoscopic display comprising passive birefringent lenses in a first mode of operation, in accordance with the present disclosure.

FIG. 8 is a schematic diagram illustrating a front view of optical layers in a window switching 2D/3D autostereoscopic display comprising passive birefringent lenses in a first mode of operation. In comparison to the arrangement of FIG. 4, layer 70 is introduced with a liquid crystal (LC) orientation 250, and has substantially no optical effect in the window switching 3D mode of operation. Thus, the window switching operation of the display may be maintained.

Figure 9:
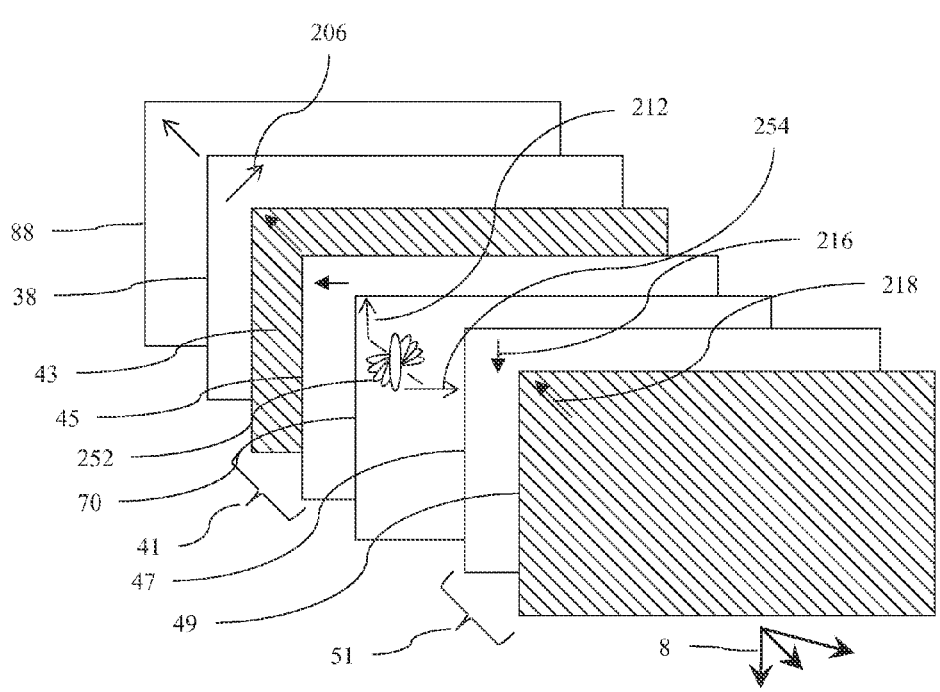
FIG. 9 is a schematic diagram illustrating a front view of optical layers in a window switching 2D/3D autostereoscopic display comprising passive birefringent lenses in a second mode of operation, in accordance with the present disclosure.

FIG. 9 is a schematic diagram illustrating a front view of optical layers in a window switching 2D/3D autostereoscopic display comprising passive birefringent lenses in a second mode of operation. In this embodiment, layer 70 may comprise a twisted nematic material state 252 that rotates the polarization state 212 to state 254. In cooperation with a fixed input polarization state 206, thus both lenses operate in transparent mode and the full 2D resolution of SLM 2 is perceived by an observer.

Figure 10A:
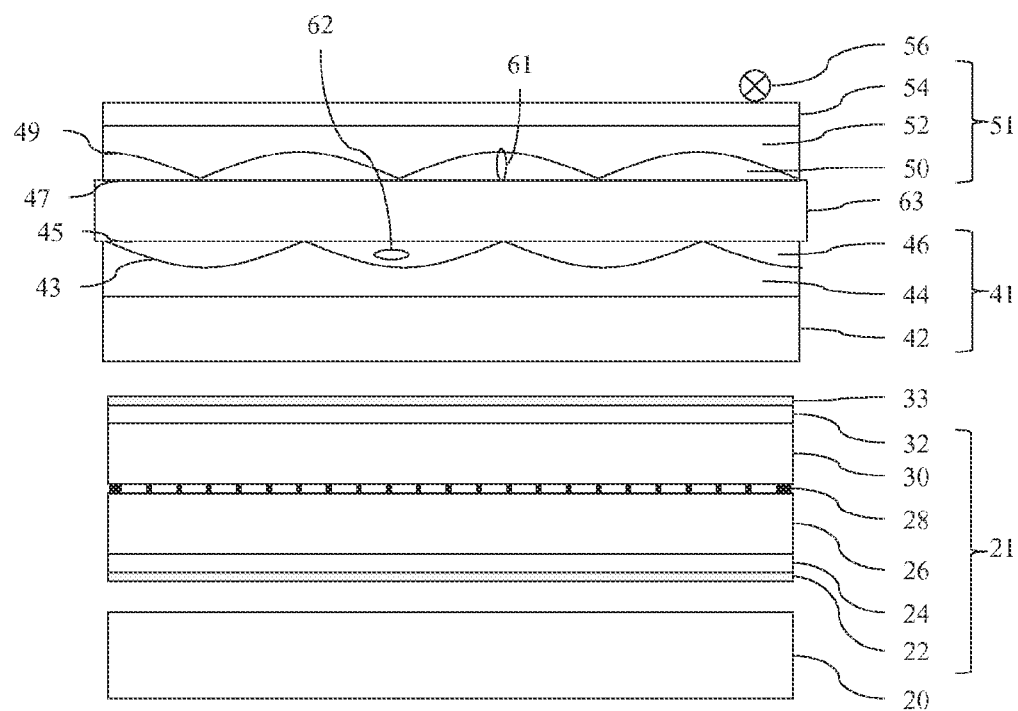
FIG. 10A is a schematic diagram illustrating a side view of a window switching 2D/3D autostereoscopic display comprising active surface relief birefringent lenses, in accordance with the present disclosure.

FIG. 10A is a schematic diagram illustrating a side view of a window switching 2D/3D autostereoscopic display comprising active surface relief birefringent lenses. In this embodiment, structures 43, 45 and structures 47, 49 are arranged with electrodes and alignment layers so that the materials 61, 62 in the layers 46, 50 may be nematic liquid crystal materials and may be switched in anti-phase. Thus, the first and second lens arrays 41 and 51 comprise respective active birefringent lens arrays, each switchable between a first state wherein the lens array 41 or 51 directs light into respective arrays of at least three optical windows in a window plane and a second state in which the lens arrays have substantially no optical effect. The electrodes may function as a lens switching arrangement to change the mode of operation, under the control of the control system. In particular, in the first mode, the first lens array 41 is switched into its first state and the second lens array 51 is switched into its second state, and, in the second mode, the first lens array 41 is switched into its second state and the second lens array 51 is switched into its first state. However, typically such lens arrays 41, 51 have thicknesses on the order of tens of micrometers, and thus have slow switching response speeds that may not be suitable for window switching displays.

Figure 10B:
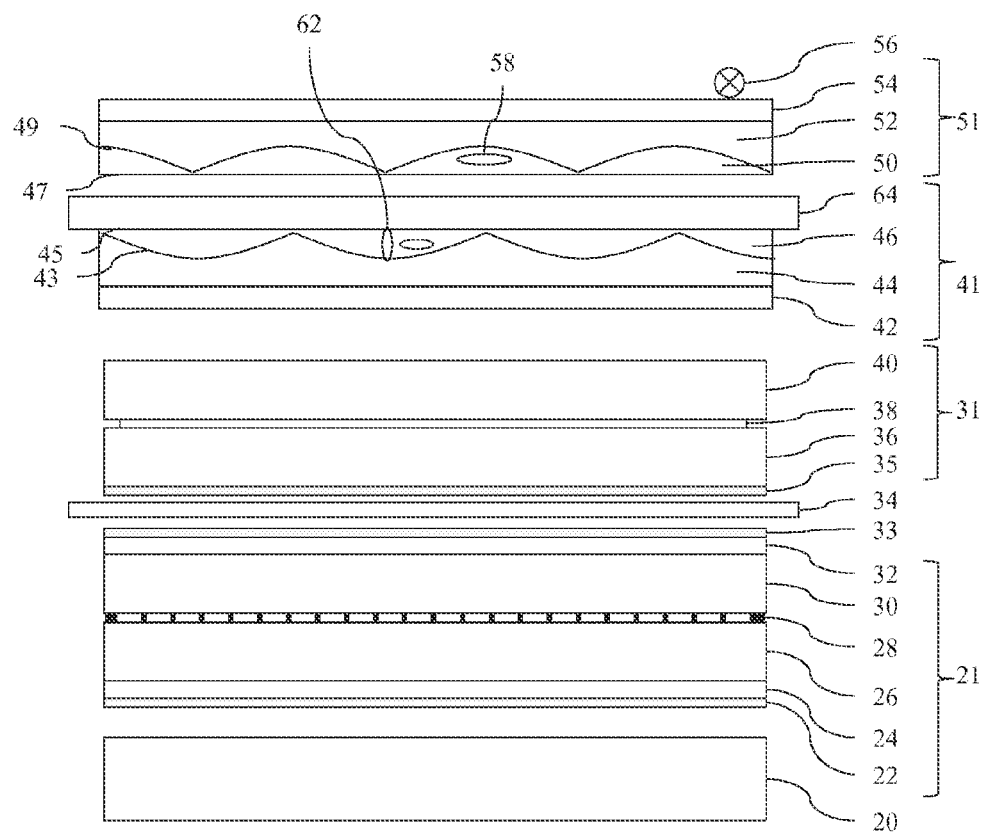
FIG. 10B is a schematic diagram illustrating a side view of a window switching 2D/3D autostereoscopic display comprising active and passive surface relief birefringent lenses, in accordance with the present disclosure.

FIG. 10B is a schematic diagram illustrating a side view of a window switching 2D/3D autostereoscopic display comprising active and passive surface relief birefringent lenses. Thus, layer 50 may comprise a passive birefringent material 58 such as a cured LC layer, whereas layer 46 may comprise a nematic LC material 62 that is switchable by means of electrodes (not shown). An optional substrate 64 may be incorporated to seal layer 46, or alternatively surface 47 may be used to provide a surface of the nematic lens array 41. In operation, material 62 is arranged to have homogeneous alignment (illustrated schematically as horizontally orientated molecules) in window switching 3D mode of operation, and the display operates as shown in FIG. 4. In 2D mode, the material 62 is aligned with homeotropic alignment (illustrated schematically as vertically orientated molecules), and the polarization state of layer 38 fixed respectively to achieve transparent operation for both lens arrays 41, 51.

Figure 10C:
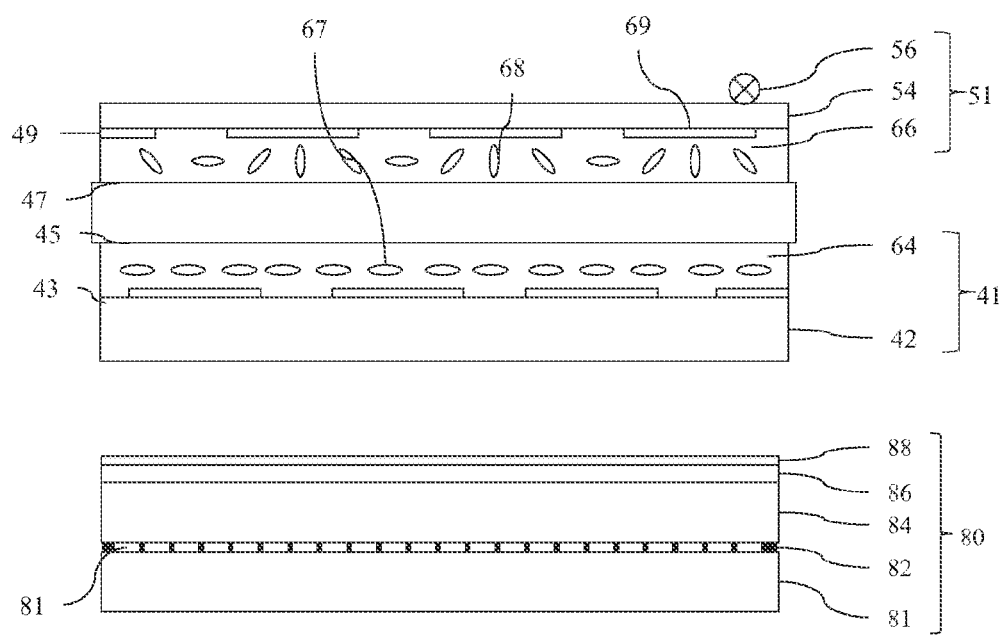
FIG. 10C is a schematic diagram illustrating a side view of a window switching 2D/3D autostereoscopic display comprising graded index active birefringent lenses, in accordance with the present disclosure.

FIG. 10C is a schematic diagram illustrating a side view of a window switching 2D/3D autostereoscopic display comprising graded index active birefringent lenses. The surface relief lenses of FIG. 10A can alternatively be provided by graded index birefringent lens layers 64, 66. Electrode arrays 69 are provided to switch the refractive index profile of the nematic material 67, 68 as is known in the art. As for FIG. 10A, the thickness of such layers 64, 66 is typically sufficiently high to reduce switching response speed, increasing cross talk.

Figure 10D:
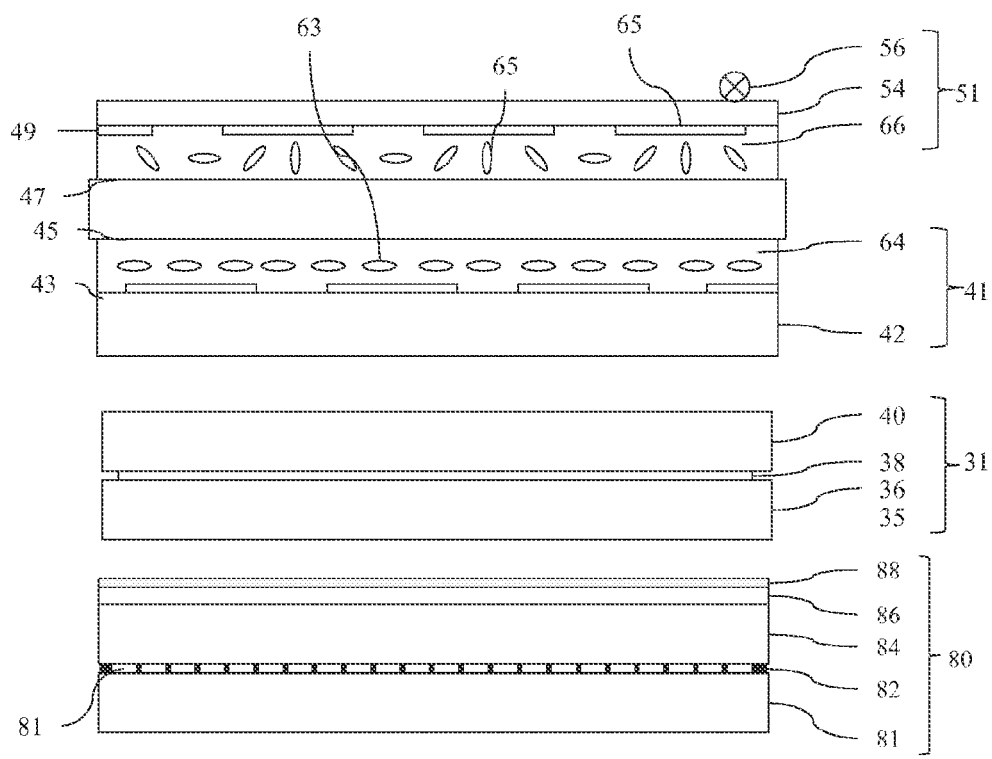
FIG. 10D is a schematic diagram illustrating a side view of a window switching 2D/3D autostereoscopic display comprising graded index active birefringent lenses, in accordance with the present disclosure.

FIG. 10D is a schematic diagram illustrating a side view of a window switching 2D/3D autostereoscopic display comprising graded index active birefringent lenses. In a 2D mode of operation, layers 64 and 66 may be switchable to 2D mode (in which the entire layer has homogeneous alignment). In a 3D mode of operation, the layers may be arranged so that layer 64 operates as a lens for light of a first polarization state, and the second layer 66 operates as a lens for light of a second, orthogonal polarization state in a similar manner to that described previously. Thus, such lenses may have fast response speed for window switching 3D operation, and may have 2D mode of operation. Further, such devices may be simpler to fabricate than nematic surface relief lenses, reducing cost and complexity.

Figure 10E:
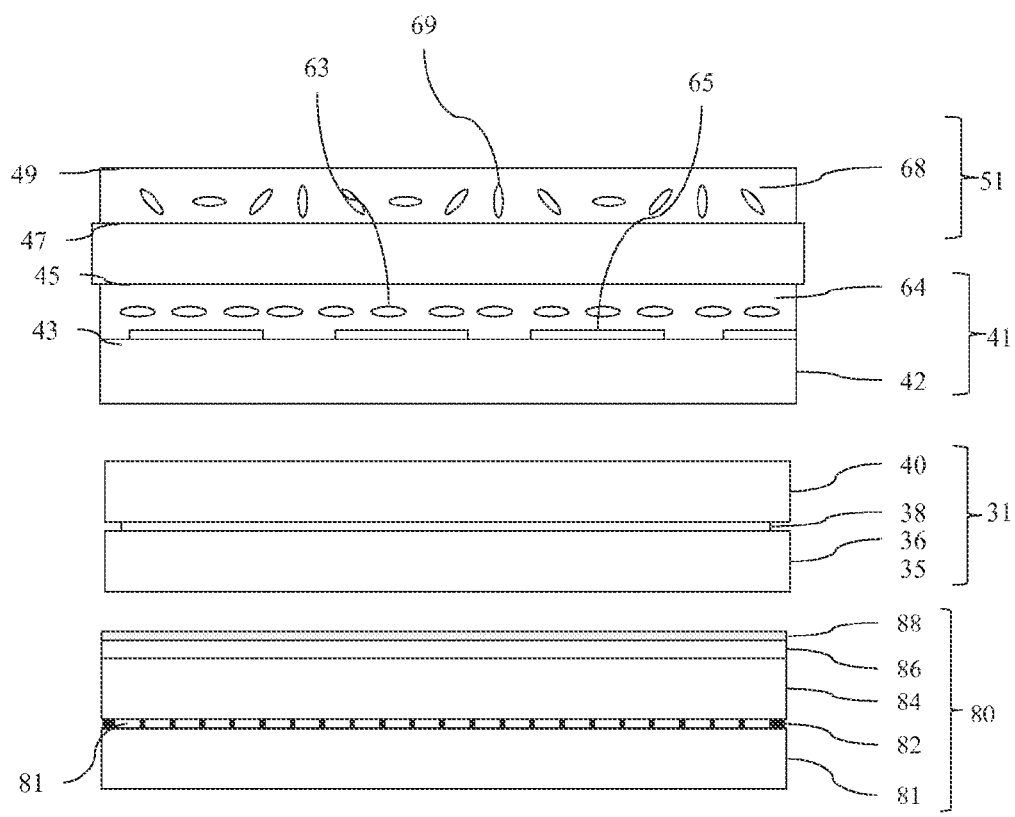
FIG. 10E is a schematic diagram illustrating a side view of a window switching 2D/3D autostereoscopic display comprising graded index active and passive birefringent lenses, in accordance with the present disclosure.

FIG. 10E is a schematic diagram illustrating a side view of a window switching 2D/3D autostereoscopic display comprising graded index active and passive birefringent lenses.

FIG. 10E is similar in structure to the arrangement of FIG. 10D; however, one of the graded index birefringent lens array layers 68 is formed from a cured polymer material 69, while the other lens array may be a switchable nematic material. Advantageously, the layer 68 may be formed as a thin polymeric layer that is attached to the switching graded index layer 64. Such an arrangement has increased ruggedness and reduced cost and complexity compared to the embodiment of FIG. 10D, while achieving window switching 3D mode with low cross talk and high resolution for 2D and 3D modes.

Figure 10F:
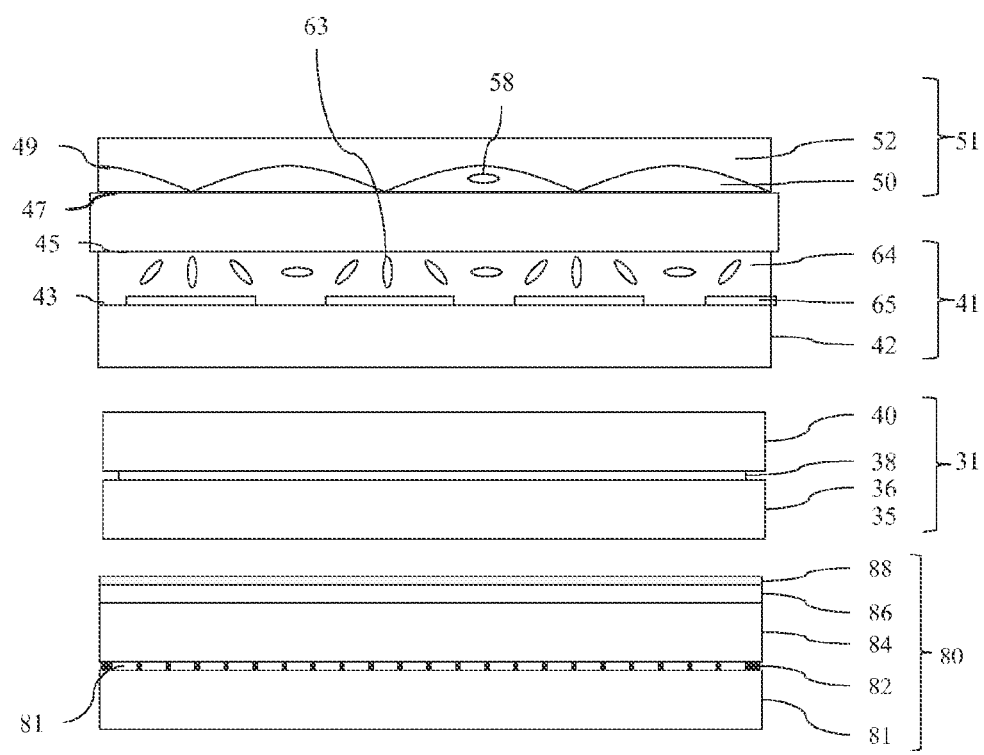
FIG. 10F is a schematic diagram illustrating a side view of a window switching 2D/3D autostereoscopic display comprising graded index active and surface relief passive birefringent lenses, in accordance with the present disclosure.

FIG. 10F is a schematic diagram illustrating a side view of a window switching 2D/3D autostereoscopic display comprising graded index active and surface relief passive birefringent lenses. The array 51 may comprise a polymer liquid crystal layer that can be conveniently manufactured and attached to a switching graded index nematic LC lens array layer 64. Advantageously, the array 51 may be fabricated with fewer disclinations than the graded index layer 68 of FIG. 10E, and may thus have higher performance.

Figure 10G:
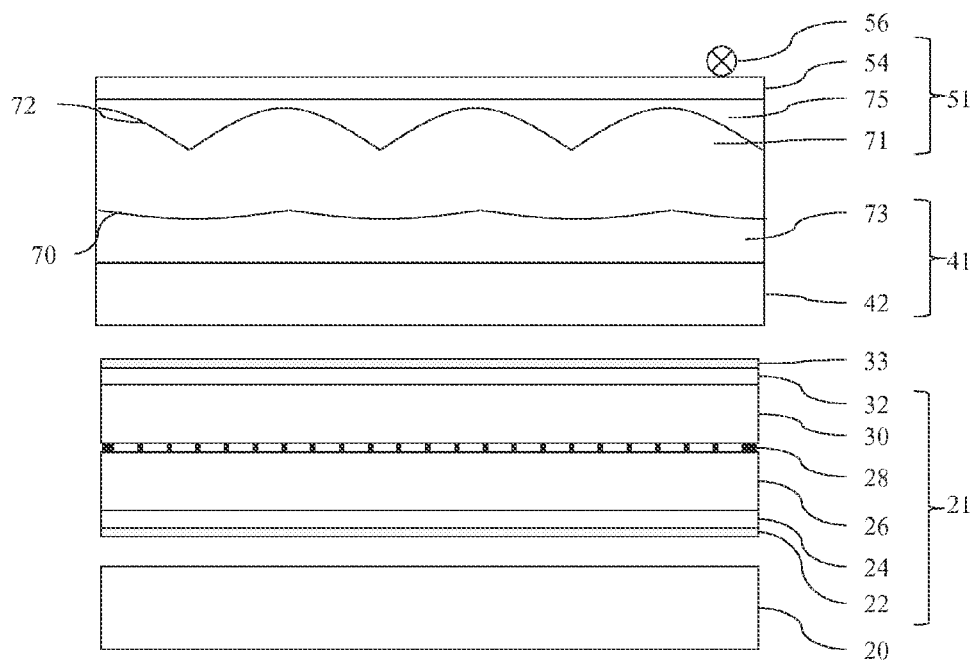
FIG. 10G is a schematic diagram illustrating a side view of a window switching 3D autostereoscopic display comprising adaptive surface relief lenses operating in a first mode, in accordance with the present disclosure.

FIG. 10G is a schematic diagram illustrating a side view of a window switching 3D autostereoscopic display comprising adaptive surface relief lenses operating in a first mode. A switchable mechanically deformable lens may comprise a layer of material 71 encapsulated between deformable surfaces 70, 72 that may be membranes, for example, with air gaps 73, 75. In operation, electric fields may be applied to the membranes 70, 72 to provide deformation so that surface 72 has a first lenticular surface relief, while surface 70 has substantially no surface relief.

Figure 10H:
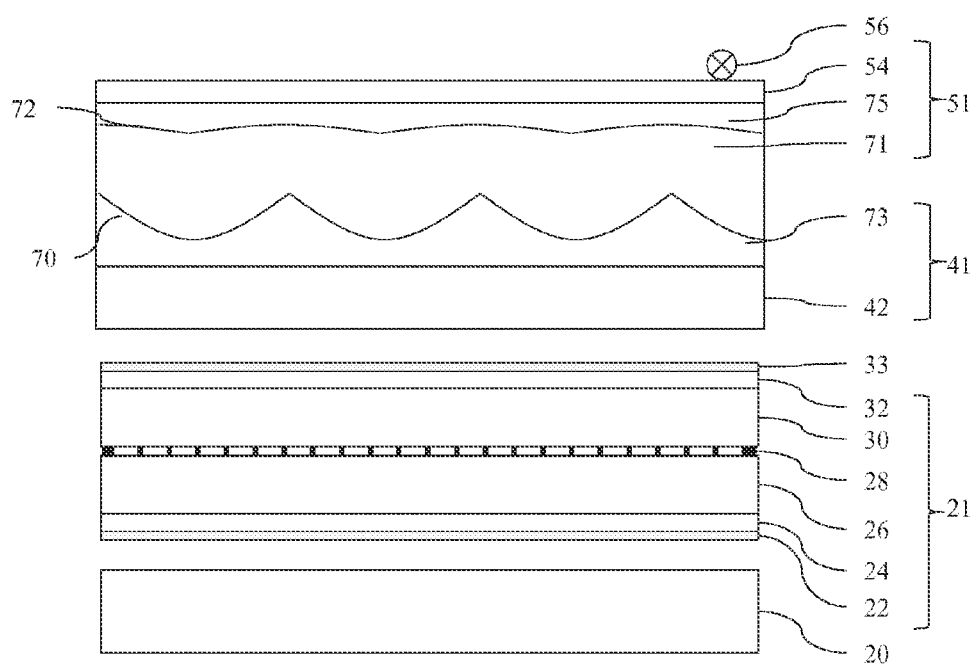
FIG. 10H is a schematic diagram illustrating a side view of a window switching 3D autostereoscopic display comprising adaptive surface relief lenses operating in a second mode, in accordance with the present disclosure.

FIG. 10H is a schematic diagram illustrating a side view of a window switching 3D autostereoscopic display comprising adaptive surface relief lenses operating in a second mode. In this mode, surface 70 is deformed, whereas surface 72 is substantially planar. Advantageously, the amount of material contained within the layer 71 is constant between the two modes.

Figure 11:
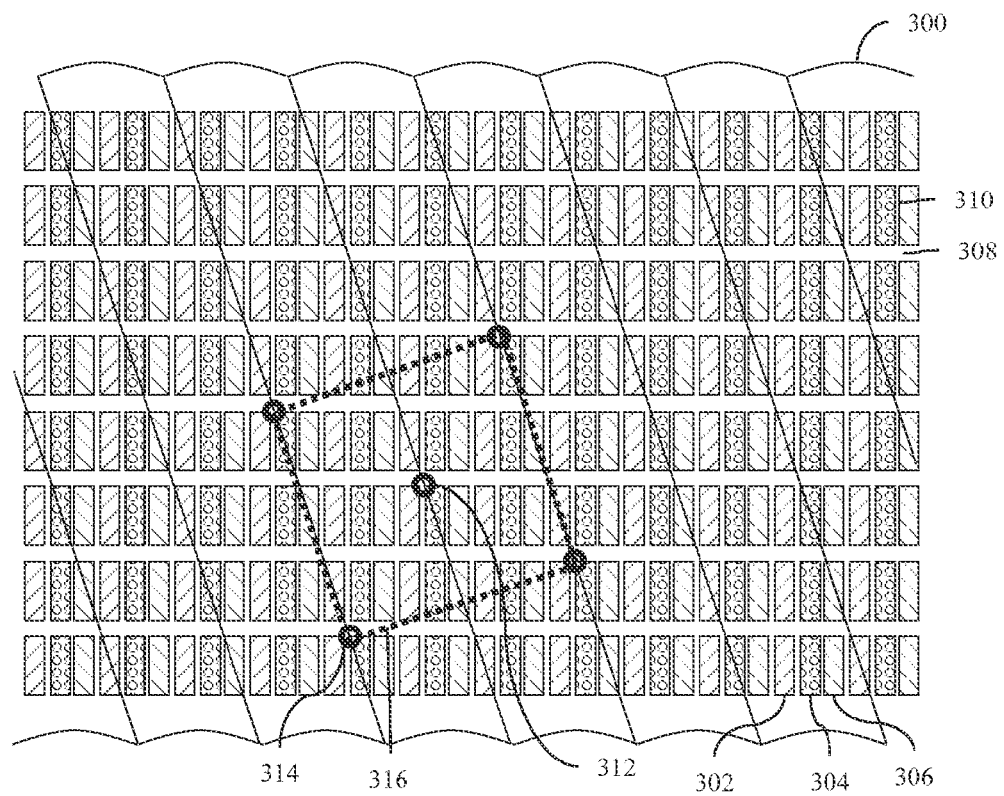
FIG. 11 is a schematic diagram illustrating a front view of a five view autostereoscopic display, in accordance with the present disclosure.

FIG. 11 is a schematic diagram illustrating a front view of a five view autostereoscopic display. A lens array 300 is arranged in alignment with an array of pixels of an SLM 2 comprising red pixels 302, green pixels 304 and blue pixels 306. The pixels are arranged in commonly used stripe arrangement with horizontal and vertical gaps 308, 310, and square 'white' pixels (containing pixels 302, 304, 306). The array 300 is shown schematically as aligned so that each edge is aligned with the top left hand corner of a pixel, and at an angle so that the pixel one row down and one column across, giving a tilt angle of 18.4 degrees. The lens pitch is substantially five times the pixel pitch, although in practice lenticular array elements will have a pitch slightly less than this to achieve a finite window plane 5 distance, as is well known in the art. In operation as a 3D display, the 3D image appearance can be determined by locating for each view the location of a central green pixel 312 and the nearest neighbor lattice points 314. In this arrangement, locus 316 is a tilted square shape at an angle of 18.4 degrees to the horizontal and vertical directions.

Figure 12:
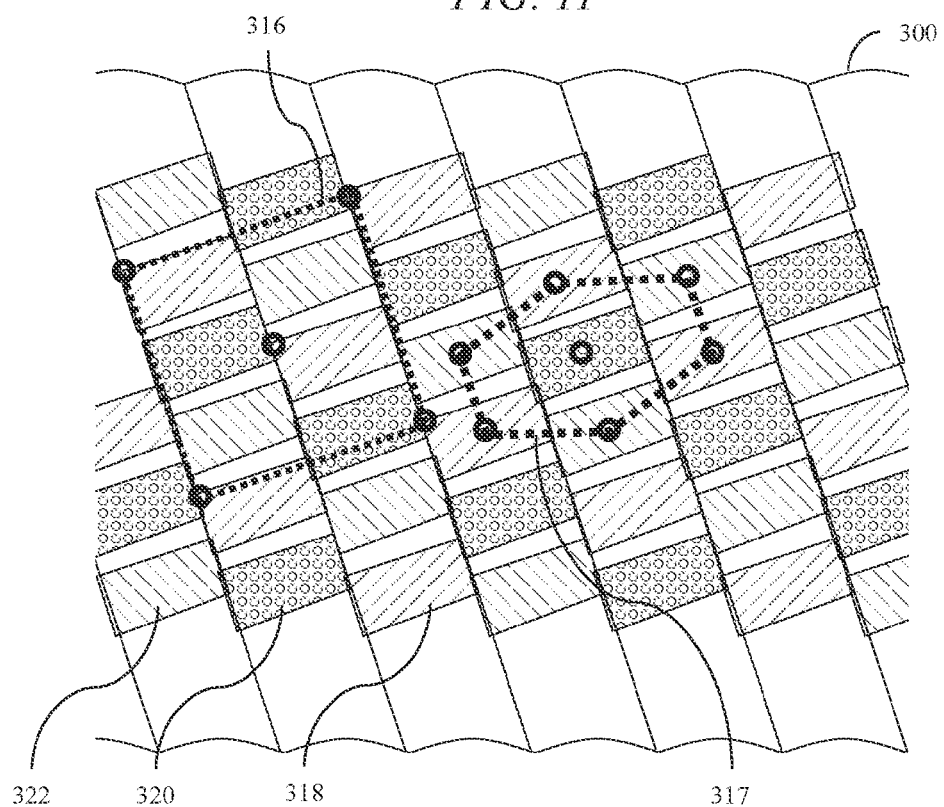
FIG. 12 is a schematic diagram illustrating in front view the 3D pixel arrangement of a five view autostereoscopic display, in accordance with the present disclosure.

FIG. 12 is a schematic diagram illustrating in front view the 3D pixel arrangement of a five view autostereoscopic display comprising red 318 pixels, green 320 pixels and blue 322 pixels. A further locus 317 can be located around each green pixel showing a rosette of red-blue-red-blue-red-blue pixels. Such a rosette may advantageously enhance the appearance of natural images, as typically used for 3D display purposes.

Figure 13:
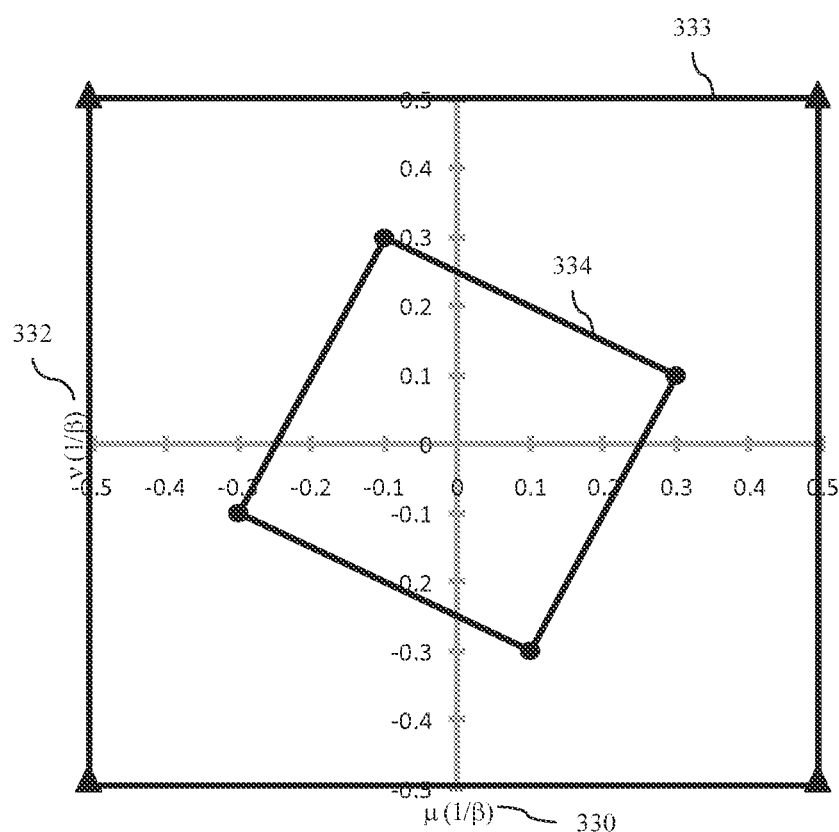
FIG. 13 is a graph illustrating the Nyquist boundary of a five view autostereoscopic display, in accordance with the present disclosure.

FIG. 13 is a graph illustrating the Nyquist boundary of a five view autostereoscopic display. The Nyquist boundary indicates the spatial frequency space in horizontal axis 330 and vertical axis 332. Locus 333 indicates the boundary of spatial frequency space for the base panel, whereas locus 334 shows the spatial frequency space of one 3D image for the five view panel of FIG. 12. The embodiment of FIGS. 11 and 12 achieve 3D images with five optical windows, with each image having a resolution that is 20% of the total SLM resolution; thus, the area inside the locus 334 is 20% of the area within locus 333. The tilt of the locus 334 also indicates that the 3D pixels may appear as inclined stripes on the display, which may produce serration errors in horizontal and vertical lines. It would thus be desirable to increase the spatial frequency characteristics of a multi-view autostereoscopic display.

Figure 14:
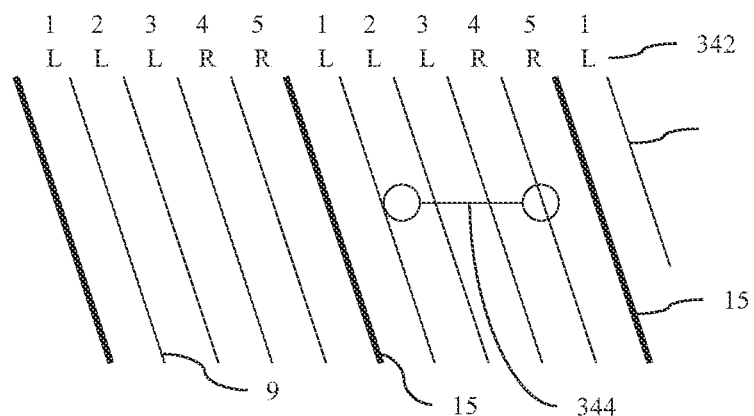
FIG. 14 is a schematic diagram illustrating the window arrangement of a five view autostereoscopic display for a first observer position, in accordance with the present disclosure.

FIG. 14 is a schematic diagram illustrating the window arrangement of a five view autostereoscopic display for a first observer position. In an image data tracking system, a display comprises repeating arrays of five optical windows with supplied data 342. An observer at position 344 may see an orthoscopic image if optical windows 4 and 5 provide a viewing window comprising right eye image data and optical windows 1, 2 and 3 provide a viewing window comprising left eye image data. Advantageously, at any point only two images are required by the display, so that multi-view image data is not required.

Figure 15:
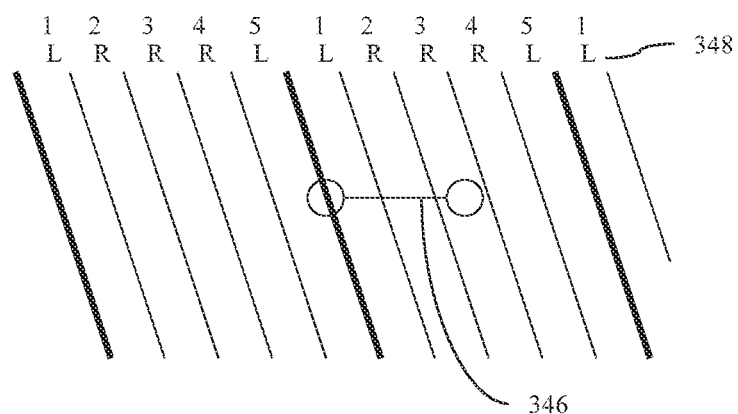
FIG. 15 is a schematic diagram illustrating the window arrangement of a five view autostereoscopic display for a second observer position, in accordance with the present disclosure.

FIG. 15 is a schematic diagram illustrating the window arrangement of a five view autostereoscopic display for a second observer position. An observer at position 346 may see an orthoscopic image if optical windows 5 and 1 provide a viewing window comprising left eye image data and windows 2, 3 and 4 provide a viewing window comprising right eye image data. In this manner, a moving observer may maintain the appearance of an orthoscopic image for a range of viewing positions by means of adjustment of the data presented to the SLM 2. Further, the observer may be tracked across the window lobe boundaries 15 while maintaining an orthoscopic image.

Figure 16:
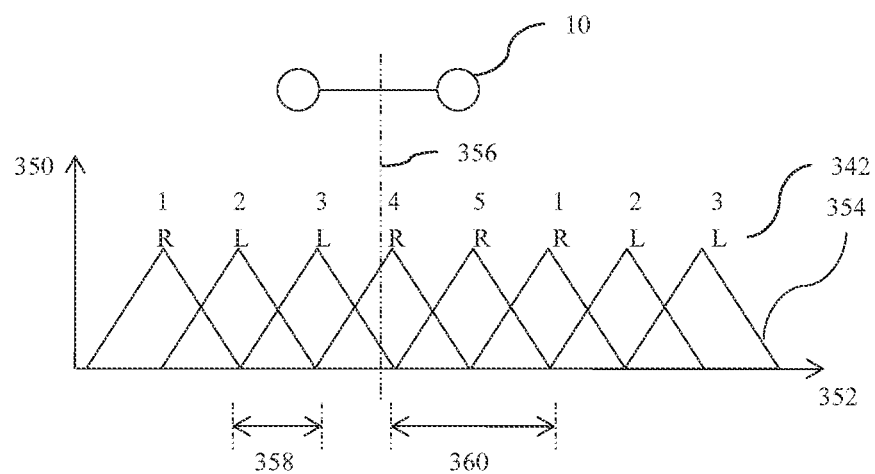
FIG. 16 is a graph illustrating a window structure of a five view autostereoscopic display for a first pixel arrangement, in accordance with the present disclosure.

FIG. 16 is a graph illustrating a window structure of a five view autostereoscopic display for a first pixel arrangement. Thus, a graph of measured intensity 350 against position 352 across the window plane can be used to determine the optimal image to present for any given observer 10 position 356. The structure of the window profile 354 may be determined by the parallax optic arrangement, its alignment to pixel and pixel shape. Such graphs can be used to determine viewing freedom prior to switching of image data for a moving observer. Thus, left eye has a freedom 358 and right eye has a viewing freedom 360 without substantial visibility of pseudoscopic image data.

Figure 17:
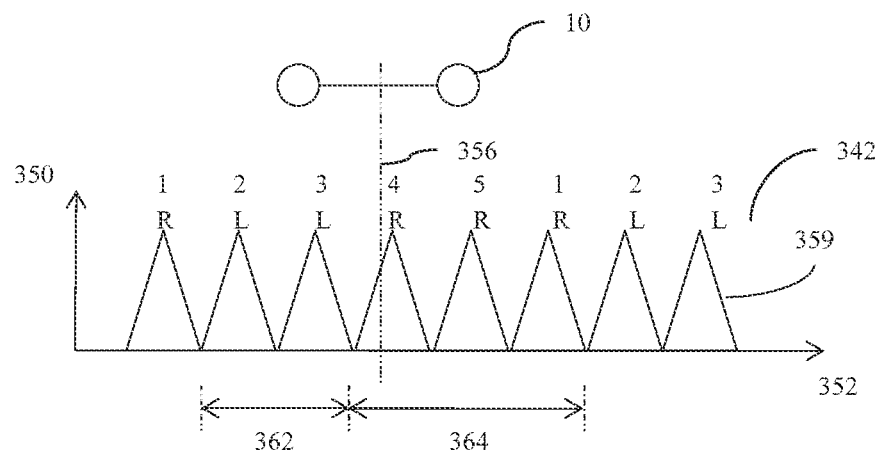
FIG. 17 is a graph illustrating a window structure of a five view autostereoscopic display for a second pixel arrangement, in accordance with the present disclosure.

FIG. 17 is a graph illustrating a window structure of a five view autostereoscopic display for a second pixel arrangement. It would be desirable to increase viewing freedom, which may be achieved by creating narrower window profiles 359 as illustrated. Thus, regions 362, 364 are wider than regions 358, 360. However, the total intensity across the window profile will vary in this embodiment, and the display will appear to flicker as the observer moves, which is a highly undesirable artifact. Thus, it would be desirable to have narrower profile optical windows, while maintaining display output uniformity. Advantageously, the present window switching embodiments may achieve reduced flicker and reduced cross talk.

Figure 18:
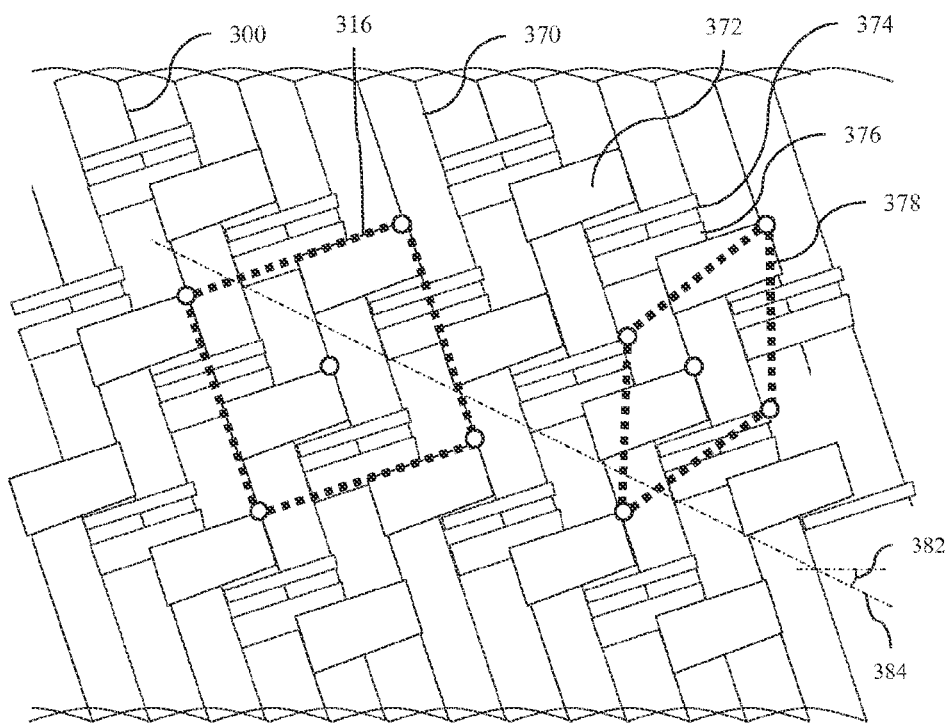
FIG. 18 is a schematic diagram illustrating in front view the 3D pixel appearance of a ten view window switching autostereoscopic display comprising vertical pixels on the spatial light modulator, in accordance with the present disclosure.

FIG. 18 is a schematic diagram illustrating in front view of the 3D pixel appearance of a ten view window switching autostereoscopic display comprising vertical pixels on the spatial light modulator. The ten views may be achieved by means of the switchable lens arrays shown in FIGS. 2-10H, for example. Each lens array 41, 51 is arranged in registration with five pixels as shown in FIG. 11, and the two lens arrays are offset by half a lens pitch. Thus, lens array 300 achieves a green 3D pixel arrangement shown by solid pixels 372, whereas the lens array 370 achieves a green 3D pixel arrangement shown by dotted pixels comprising sub-pixel regions 374, 376. In operation, an observer will not typically resolve the sub-pixel regions separately and will perceive a repeat structure based on their pitch. Thus, first pixels 372 are generated in a first mode and second pixels 374, 376 are generated in a second mode. With a fast response SLM 2 and switch 38, such as 120 Hz, the eye will perceive a combined 3D pixel arrangement with a unit cell locus 378 as indicated. The green pixels are arranged on an axis 384 with an angle 382 of substantially 26.6 degrees to the horizontal.

Figure 19:
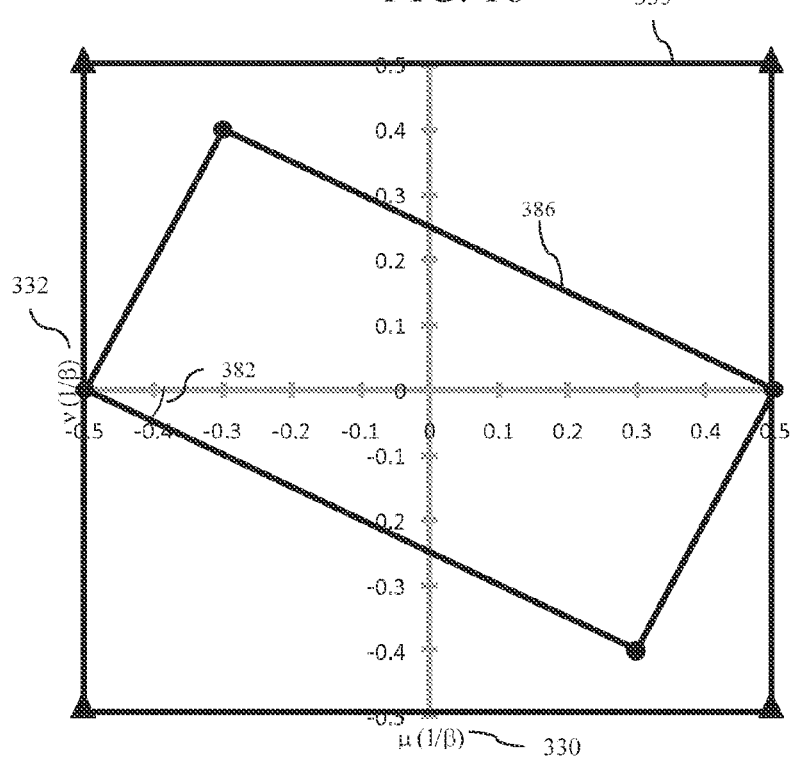
FIG. 19 is a graph illustrating the Nyquist boundary of a ten view window switching autostereoscopic display comprising vertical pixels on the spatial light modulator, in accordance with the present disclosure.

FIG. 19 is a graph illustrating the Nyquist boundary of a ten view window switching autostereoscopic display comprising vertical pixels on the spatial light modulator. Thus, spatial frequency locus 386 is achieved with substantially the same resolution in a horizontal direction, and total area 40% of SLM 2 locus 333. Undesirably, the tilt angle 382 means that horizontal and vertical lines are difficult to reproduce without some stagger, degrading the appearance of text for example.

Figure 20:
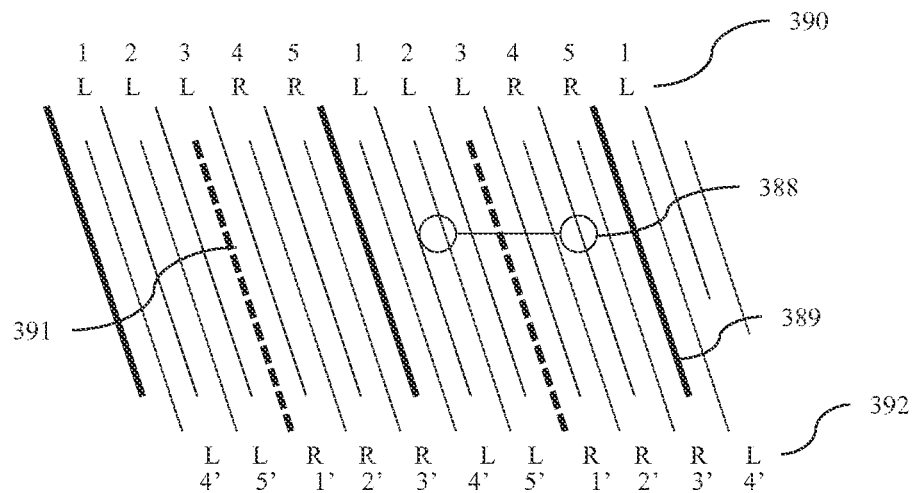
FIG. 20 is a schematic diagram illustrating the window arrangement of a ten view window switching autostereoscopic display for a first observer position, in accordance with the present disclosure.

FIG. 20 is a schematic diagram illustrating the window arrangement of a ten view window switching autostereoscopic display for a first observer position 388. In operation for an observer 10 at position 388, two sets of overlapping and offset windows are achieved by the window switching displays described previously. Thus, lobe boundary 391 achieved by the second lens array operation is arranged in the center of window 3, and lobe boundary 389 achieved by the first lens array operation is arranged in the center of window 3'. For observer position 388, a first set of optical windows 1-5 provide viewing windows comprising image data 390 arranged 1L, 2L, 3L, 4R, 5R and a second set of windows 1'-5' provide viewing windows comprising image data 392 arranged 1'R, 2'R, 3'R, 4'L, 5'L.

Figure 21:
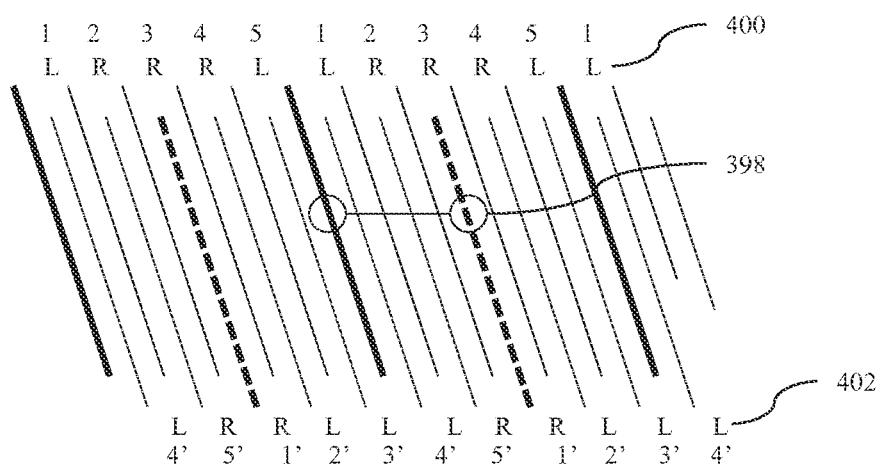
FIG. 21 is a schematic diagram illustrating the window arrangement of a ten view window switching autostereoscopic display for a second observer position, in accordance with the present disclosure.

FIG. 21 is a schematic diagram illustrating the window arrangement of a ten view window switching autostereoscopic display for a second observer position. For observer position 398, a first set of optical windows 1-5 provide viewing windows comprising image data 400 arranged 1L, 2R, 3R, 4R, 5L and a second set of optical windows 1'-5' provide viewing windows comprising image data 402 arranged 1'R, 2'L, 3'L, 4'L, 5'R.

Figure 22:
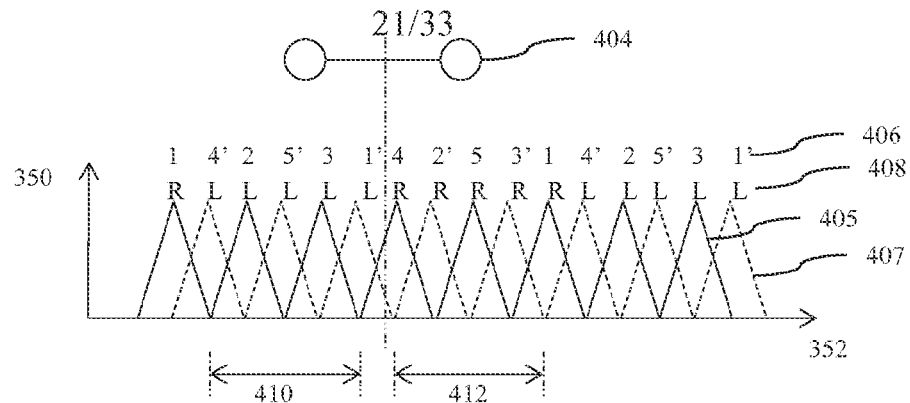
FIG. 22 is a graph illustrating a window structure of a ten view window switching autostereoscopic display, in accordance with the present disclosure.

FIG. 22 is a graph illustrating a window structure of a ten view window switching autostereoscopic display. Window array numbers 406 comprise respective data 408 so that an observer 10 position 404 sees correct left and right eye image data for each respective tracked observer position. Window profiles 405, 407 may be arranged to provide wide viewing freedoms 410, 412, while maintaining display uniformity. Window width may be increased to further enhance window plane 5 uniformity, reducing display flicker for a moving observer.

Figure 23:
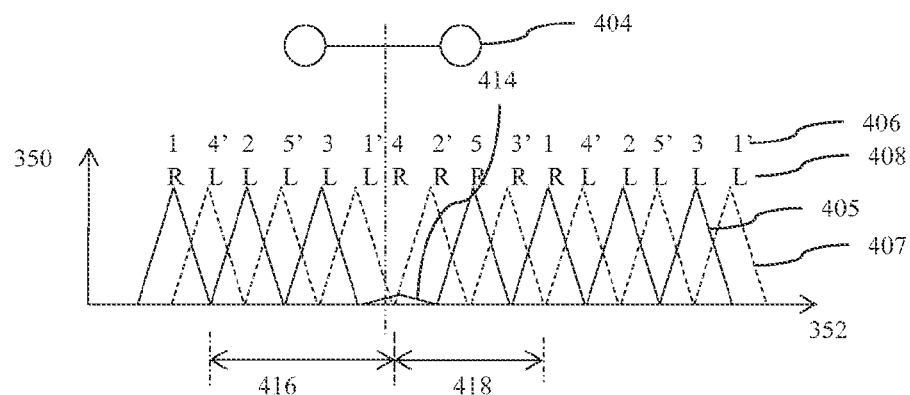
FIG. 23 is a graph illustrating a window structure of a ten view window switching autostereoscopic display with one reduced intensity window, in accordance with the present disclosure.

FIG. 23 is a graph illustrating a window structure of a ten view window switching autostereoscopic display with one reduced intensity window. Thus, window 414 (for window 4) may have reduced intensity in the region around the observer's nose (i.e., the center point between an observer's eyes), to further increase the lateral viewing freedom, particularly for a moving observer.

Figure 24:
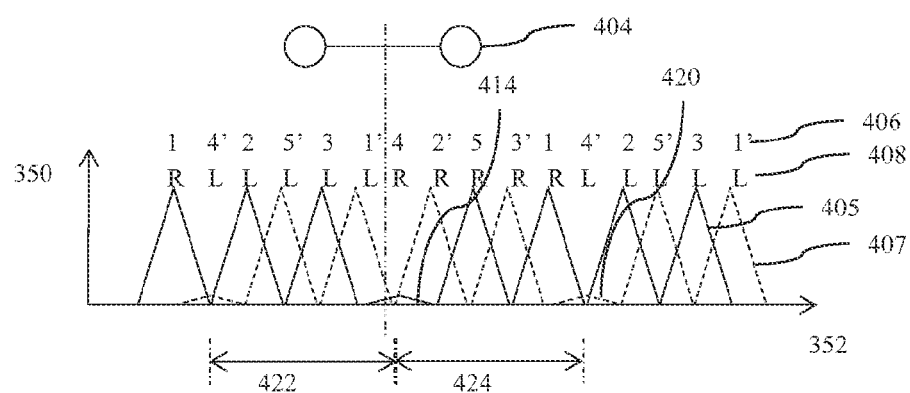
FIG. 24 is a graph illustrating a window structure of a ten view window switching autostereoscopic display with two reduced intensity windows, in accordance with the present disclosure.

FIG. 24 is a graph illustrating a window structure of a ten view window switching autostereoscopic display with two reduced intensity windows. The intensity reduction of window 414 may create an intensity artifact between left and right eyes, and thus it may further be desirable to reduce the intensity of a second window 420 (for window 4') to advantageously achieve low cross talk and maintain equal intensity for each view.

Figure 25:
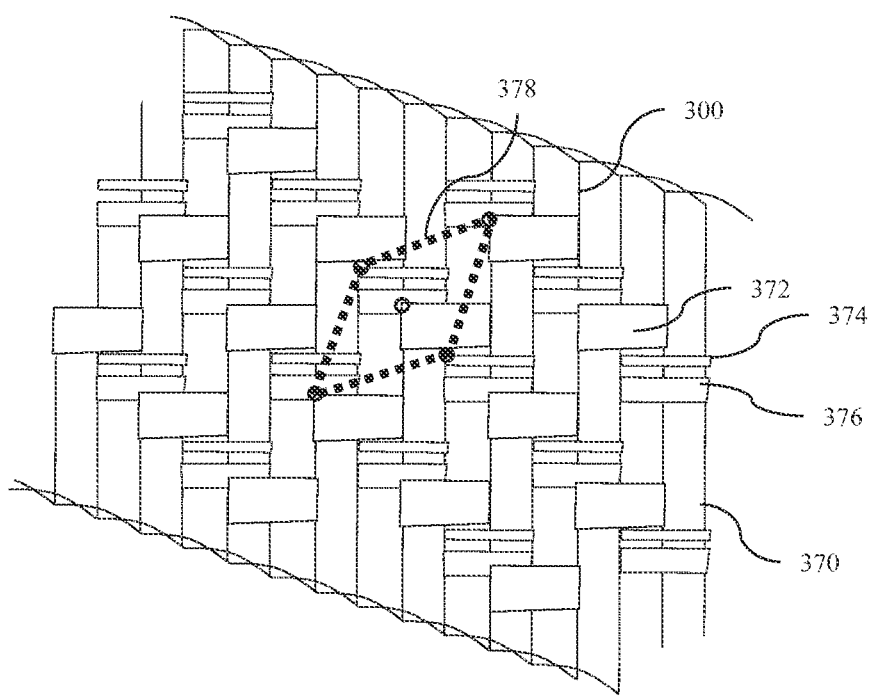
FIG. 25 is a schematic diagram illustrating in front view the 3D pixel appearance of a ten view window switching autostereoscopic display comprising vertical lens orientation, in accordance with the present disclosure.

FIG. 25 is a schematic diagram illustrating a front view of the 3D pixel appearance of a ten view window switching autostereoscopic display comprising vertical lens orientation. In this embodiment, the pixels and lens arrays of FIG. 18 have been rotated clockwise by 18.4 degrees so that the lenses (and thus optical windows) are arranged vertically. Advantageously, such an arrangement does not require observer tracking to be undertaken in horizontal and vertical axes, thus reducing potential tracking errors and increasing reliability.

Figure 26:
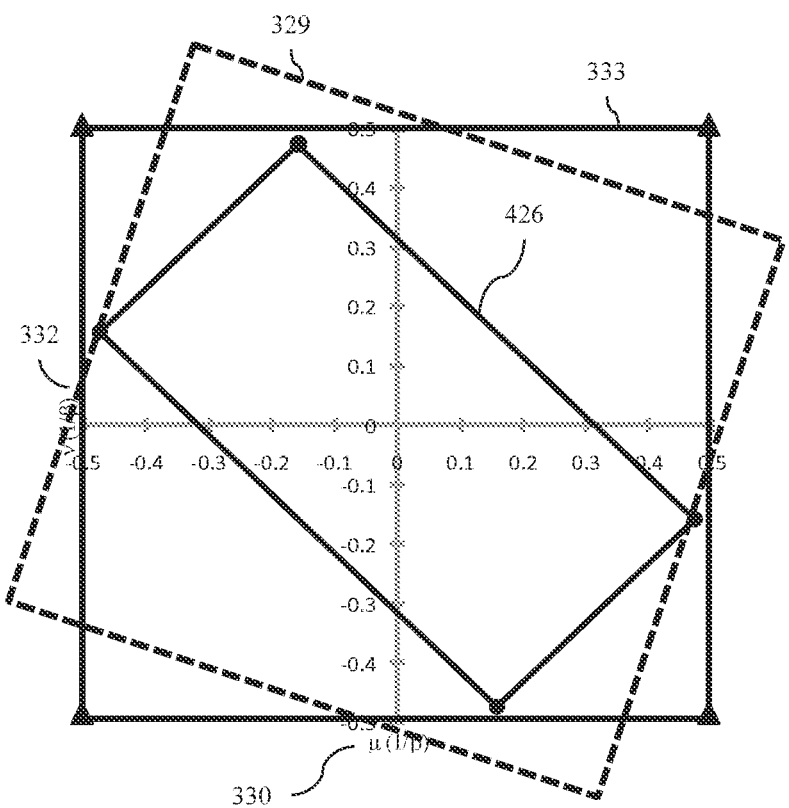
FIG. 26 is a graph illustrating the Nyquist boundary of a ten view window switching autostereoscopic display comprising vertical lens orientation, in accordance with the present disclosure.

FIG. 26 is a graph illustrating the Nyquist boundary of a ten view window switching autostereoscopic display comprising vertical lens orientation. Boundary 329 represents the appearance of the base panel that would be seen if the effect of the lens array were to be removed. Advantageously, the vertical and horizontal resolutions of the 3D pixels are more evenly balanced than the arrangement of FIG. 19. However, the arrangement of FIG. 25 achieves a 45 degree tilt to the boundary 426, creating staggered horizontal and vertical edges.

Figure 27:
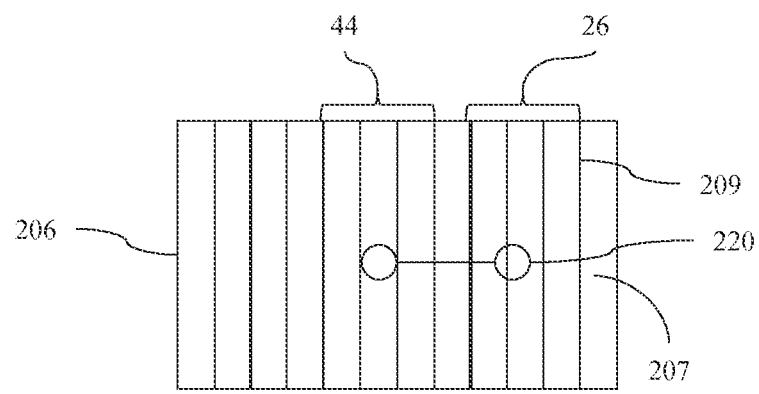
FIG. 27 is a schematic diagram illustrating a front view of an array of viewing windows of an autostereoscopic display during landscape operation, in accordance with the present disclosure.

FIG. 27 is a schematic diagram illustrating a front view of the array 206 of optical windows comprising a vertical optical window orientation for viewing an autostereoscopic display in landscape mode. The array of pixels of the SLM 2 are arranged in an aperture that has a rectangular shape. The windows are arranged to comprise left and right eye image data. An observer 220 will see an orthoscopic 3D image, formed by composite windows (comprising groups of sub-windows) 26,44 in respective right and left eyes. Observer movement in the horizontal direction can be achieved by adjusting the position of composite window 26, 44 by means of controlling the image data supplied to each of the sub-windows of the array 206. An observer moving in the vertical direction can maintain an orthoscopic image without adjusting the image content of the composite windows.

Figure 28:
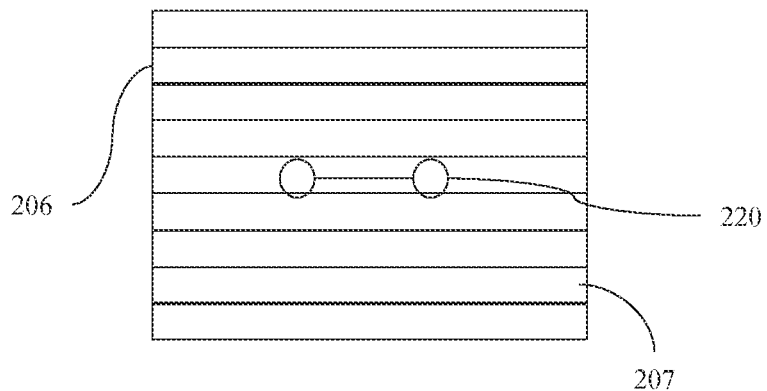
FIG. 28 is a schematic diagram illustrating a front view of an array of viewing windows of an autostereoscopic display during portrait operation, in accordance with the present disclosure.

FIG. 28 is a schematic diagram illustrating a front view of the array 206 of optical windows comprising a horizontal optical window orientation for viewing the same autostereoscopic display in portrait mode. Thus the window array 206 has rotated horizontally together with the display, for example in a mobile display used for landscape and portrait operations. Observer 220 has both eyes in the same horizontally extended window and no autostereoscopic image would be perceived, instead a single 2D view is seen.

It would be desirable to provide a display system that can be used in landscape and portrait modes for 3D operation, particularly for mobile display platforms and also rotatable desktop and advertising displays for example.

Figure 29A:
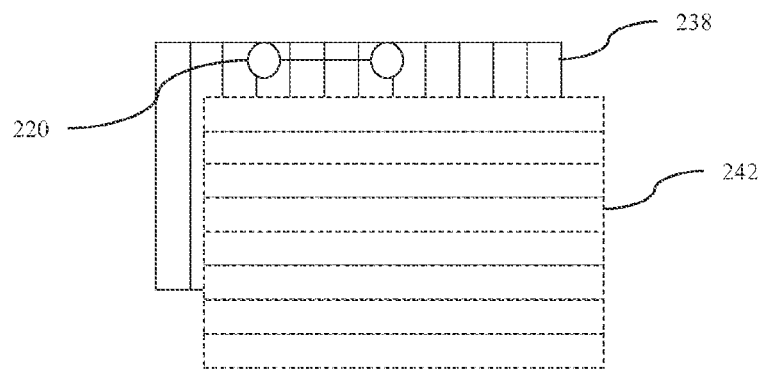
FIG. 29A is a schematic diagram illustrating a front view of an array of viewing windows from an autostereoscopic display apparatus comprising two sets of independently switchable windows for landscape operation, in accordance with the present disclosure.
Figure 29B:
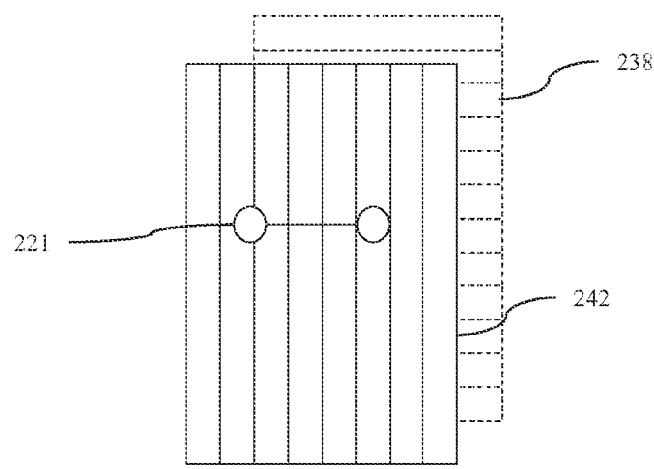
FIG. 29B is a schematic diagram illustrating a front view of an array of viewing windows from an autostereoscopic display apparatus comprising two sets of independently switchable windows for portrait operation, in accordance with the present disclosure.

FIG. 29A is a schematic diagram illustrating a front view of an array of viewing windows from an autostereoscopic display that comprises two sets of independently switchable windows 238 and 242 controlled to provide landscape operation but is otherwise the same. Such a display may comprise for example a spatially multiplexed autostereoscopic display comprising a stack of lens arrays switchable between a first lens structure and a second lens structure, as known in the art. Thus the observer 220 sees light from window array 238 and no light from window array 242. Such an observer can be tracked as described above. Similarly, FIG. 29B is a schematic diagram illustrating a front view of an array of viewing windows from an autostereoscopic display that comprises two sets of independently switchable windows 238 and 242 controlled to provide portrait operation. Thus the observer 220 sees light from window array 242 and no light from window array 238. In this manner, a spatially multiplexed display can achieve two independently tracked window arrays 238, 242 for landscape and portrait operation. Disadvantageously such a system has increased cost, thickness and light losses compared to a single lens array arrangement.

Figure 30A:
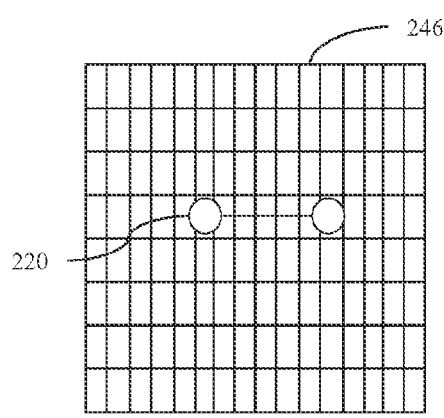
FIG. 30A is a schematic diagram illustrating a front view of an array of viewing windows from an autostereoscopic display apparatus comprising a two dimensional window array for landscape operation, in accordance with the present disclosure.
Figure 30B:
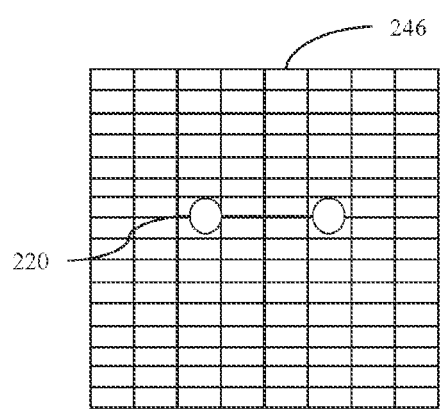
FIG. 30B is a schematic diagram illustrating a front view of an array of viewing windows from an autostereoscopic display apparatus comprising a two dimensional window array for portrait operation, in accordance with the present disclosure.

FIG. 30A is a schematic diagram illustrating a front view of an array 246 of optical windows from an autostereoscopic display apparatus comprising a two dimensional array of viewing windows controlled to provide landscape operation for an observer 220 and FIG. 30B is a schematic diagram illustrating a front view of an array of viewing windows from an autostereoscopic display apparatus comprising a two dimensional 246 array of optical windows controlled to provide portrait operation for an observer 220. Window array 246 may provide independently controlled windows for horizontal and vertical observer position movement in both landscape and portrait modes. Such a display may be provided by means for example of an integral imaging display comprising a microlens array in alignment with a spatial light modulator as known in the art. Disadvantageously such an arrangement has substantially reduced resolution 3D images.

There will now be described an autostereoscopic display apparatus in which the array of pixels of the SLM 2 are arranged in an aperture that has a rectangular shape, but is capable of providing landscape and portrait operation.

Figure 31A:
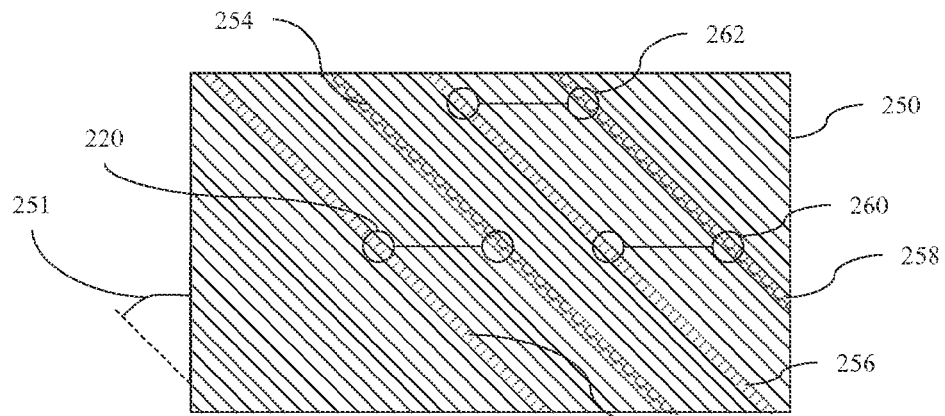
FIG. 31A is a schematic diagram illustrating a front view of an array of viewing windows for providing landscape and portrait operation from an autostereoscopic display apparatus when used in landscape mode, in accordance with the present disclosure.
Figure 31B:
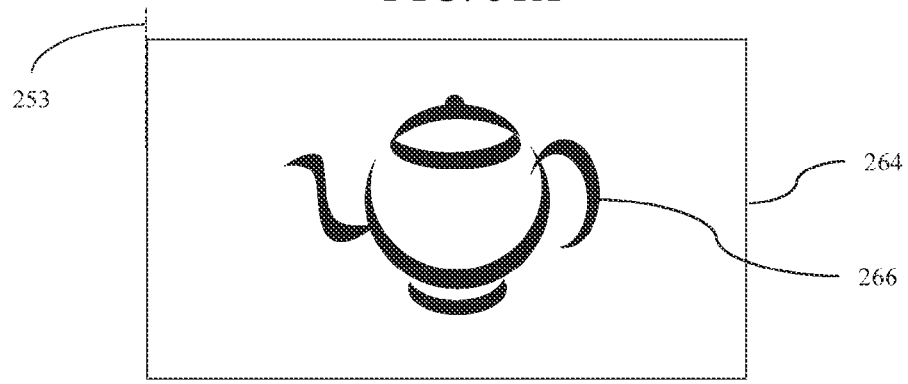
FIG. 31B is a schematic diagram illustrating a front view of an image from an autostereoscopic display apparatus in landscape mode, in accordance with the present disclosure.

FIG. 31A is a schematic diagram illustrating a front view of an array of optical windows 250 from the autostereoscopic display apparatus when used in landscape mode and FIG. 31B is a schematic diagram illustrating a front view of an image from the autostereoscopic display apparatus in landscape mode. Thus optical windows 250 are inclined at an angle 251 that is in a range around 45 degrees to an axis of mirror symmetry of the rectangular shape of the aperture, in this example the minor axis of mirror symmetry 253, although of course the angle to the major axis of mirror symmetry. The range may be from 25 to 65 degrees, preferably from 30 to 60 degrees, more preferably from 35 to 55 degrees and more preferably from 40 to 50 degrees, and most preferably at 45 degrees. The line between the observer's eyes is thus substantially orthogonal to the panel axis for landscape viewing and parallel to the panel axis for portrait viewing. In landscape mode, observer sees image 266 on the panel 264 for one eye.

The angled viewing windows may be used by the control system to provide autostereoscopic display of images in varied orientations of the display device, by controlling the display in dependence on a detected position of the observer and on a detected orientation of the view. In particular, since the angled windows are separated along both axes of mirror symmetry, left and right images can be directed to be displayed images in viewing windows in positions corresponding to the left and right eyes of the observer, when the display apparatus is viewed in orientations in which either axis is at or around vertical, as follows.

FIGS. 31A and 31B illustrate the operation when the detected orientation is a landscape view (i.e. the axis 253 or mirror symmetry is vertical). For an observer 220 at a known horizontal and vertical position with respect to the display, the sub-window 252 (and adjacent sub-windows) may comprise left eye image data and the sub-window 254 may comprise right eye image data. If the observer moves laterally to a position 260, then the sub-window 256 may be addressed with left eye data and the sub-window 258 may comprise right eye data. If the observer moves further vertically and horizontally in a 45 degrees direction to position 262 then the window data may remain unchanged even though there has been a component of lateral movement. Thus an observer tracking system must determine observer position in two directions and update the display accordingly. Further if the longitudinal position is known then the display can be updated in view slices to increase the viewing freedom.

Figures 32A, 32B:
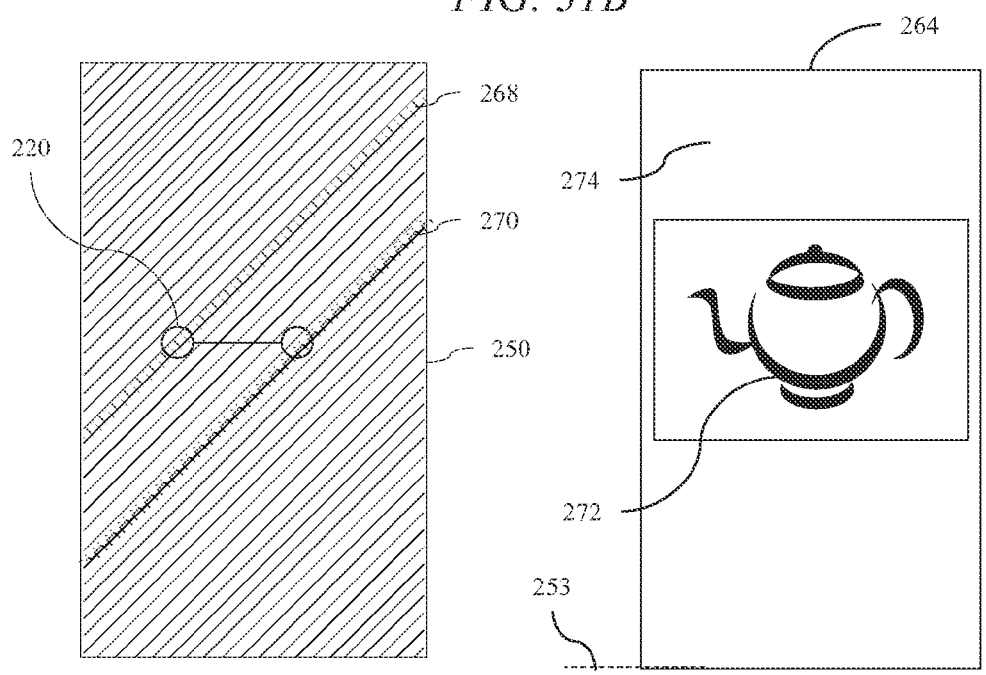
FIG. 32A is a schematic diagram illustrating a front view of an array of viewing windows for providing landscape and portrait operation from an autostereoscopic display apparatus when used in portrait mode, in accordance with the present disclosure.
FIG. 32B is a schematic diagram illustrating a front view of an image from an autostereoscopic display apparatus in portrait mode, in accordance with the present disclosure.

FIGS. 32A and 32B illustrate the operation when the detected orientation is a portrait view (i.e. the minor axis of mirror symmetry 253 is horizontal). FIG. 32A is a schematic diagram illustrating a front view of an array 250 of optical windows for providing landscape and portrait operation from an autostereoscopic display apparatus when used in portrait mode. FIG. 32B is a schematic diagram illustrating a front view of an image from an autostereoscopic display apparatus in portrait mode. In this embodiment, sub-window 268 may be addressed with left eye image data while sub-window 270 may be addressed with right eye image data. The portrait image may comprise stereo image data 272 and 2D image data 274 for example. Advantageously a single one dimensional (i.e. extended in a 45 degree direction) set of windows from a single parallax optical system may be arranged to achieve landscape and portrait operation when used in cooperation with an observer tracking system. Such an arrangement can achieve increased efficiency and reduced cost compared to systems capable of achieving two dimensional window arrays.

Figure 33:
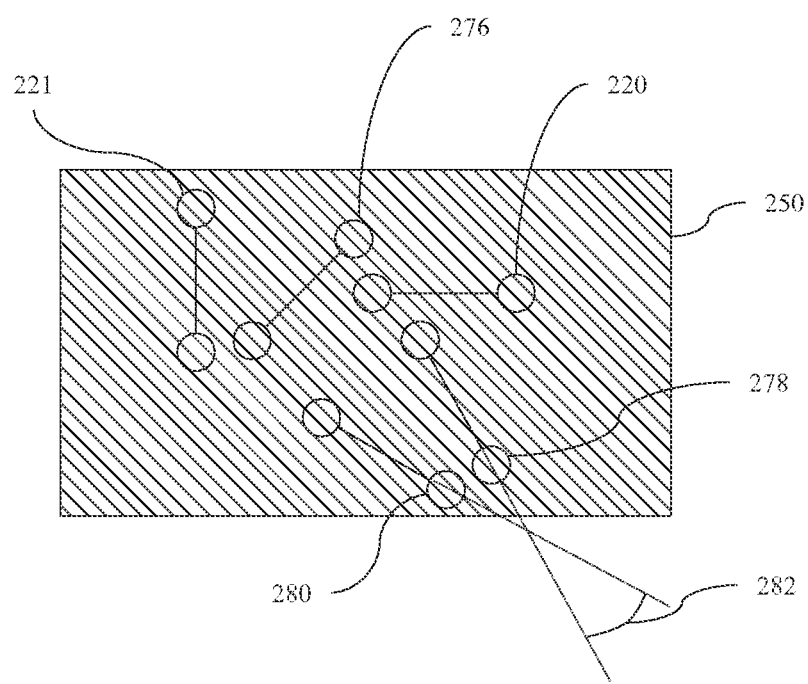
FIG. 33 is a schematic diagram illustrating a front view of an array of viewing windows for landscape and portrait operation schematically illustrating limits on panel rotation angle, in accordance with the present disclosure.

FIG. 33 is a schematic diagram illustrating a front view of an array of optical windows 250 for landscape and portrait operation schematically illustrating limits on panel rotation angle. Thus observer 220, 221, 276 can be presented with well controlled stereoscopic images. For observers in the angular range 282 and bounded by observer positions 278, 280 then little or no stereoscopic image will be seen. For these observer orientations, the control system may be arranged to address the panel with 2D data to avoid loss of fidelity from image cross talk.

It would be desirable to provide a spatially multiplexed autostereoscopic display apparatus that can achieve landscape and portrait modes of operation from a single optical system (such as a single lens array) that provide a one dimensional array of optical windows 250, thus reducing system complexity and cost.

Figure 34:
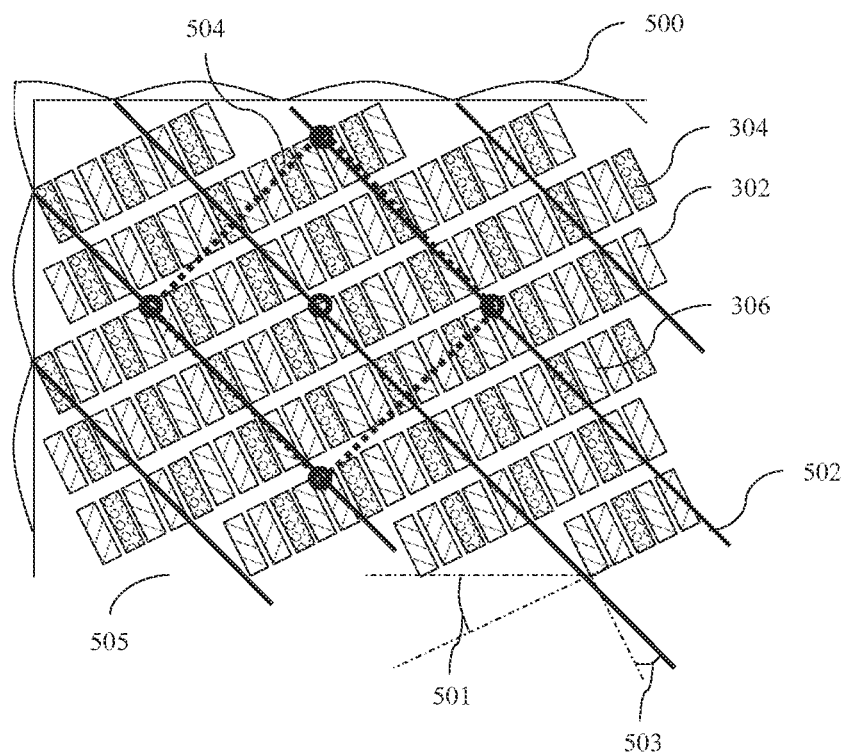
FIG. 34 is a schematic diagram illustrating in front view the 3D pixel appearance of a five view spatially multiplexed autostereoscopic display comprising a 45 degrees lens orientation, in accordance with the present disclosure.
Figure 35:
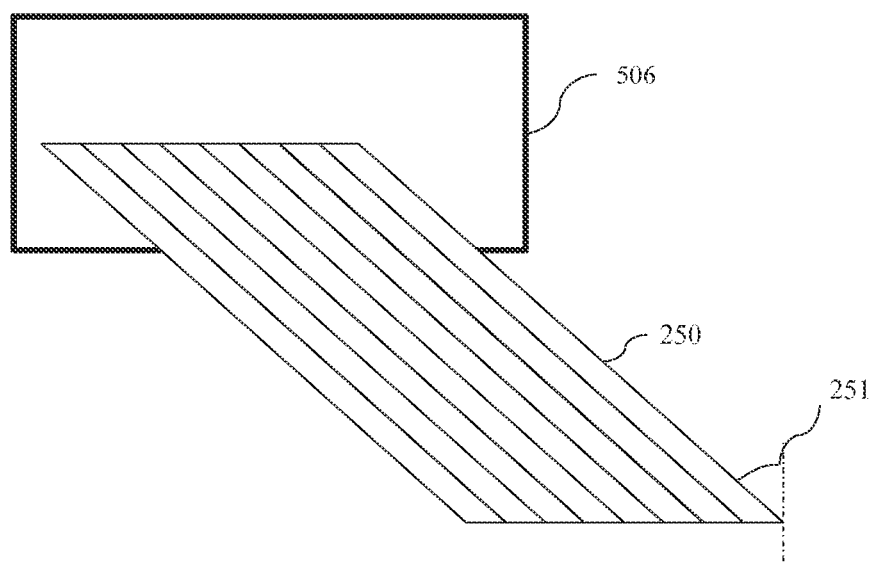
FIG. 35 is a schematic diagram illustrating a front view of window formation from the spatially multiplexed display of FIG. 34, in accordance with the present disclosure.

FIG. 34 is a schematic diagram illustrating in front view the 3D pixel appearance of a five view spatially multiplexed autostereoscopic display comprising a 45 degrees lens orientation. Pixels 302, 304, 306 of a spatial light modulator 505 are inclined at an angle 501 of 26.6 degrees to the horizontal and at an angle 503 of 18.4 degrees to the lens axes 502 of lens array 500, achieving unit cell 504 in 3D mode. FIG. 35 is a schematic diagram illustrating a front view of window formation from the spatially multiplexed display of FIG. 34. Display 506 comprising lens array 500 and pixels 302, 304, 306 of FIG. 34 thus achieves optical windows 250 inclined at an angle 251 of 45 degrees to the axis of the display 506. Thus a five view spatially multiplexed display advantageously achieves optical windows that are inclined at 45 degrees to the vertical axis of the SLM 505. Such a display can advantageously achieve observer tracking autostereoscopic display in landscape and portrait modes of operation from a low cost structure.

Figure 36:
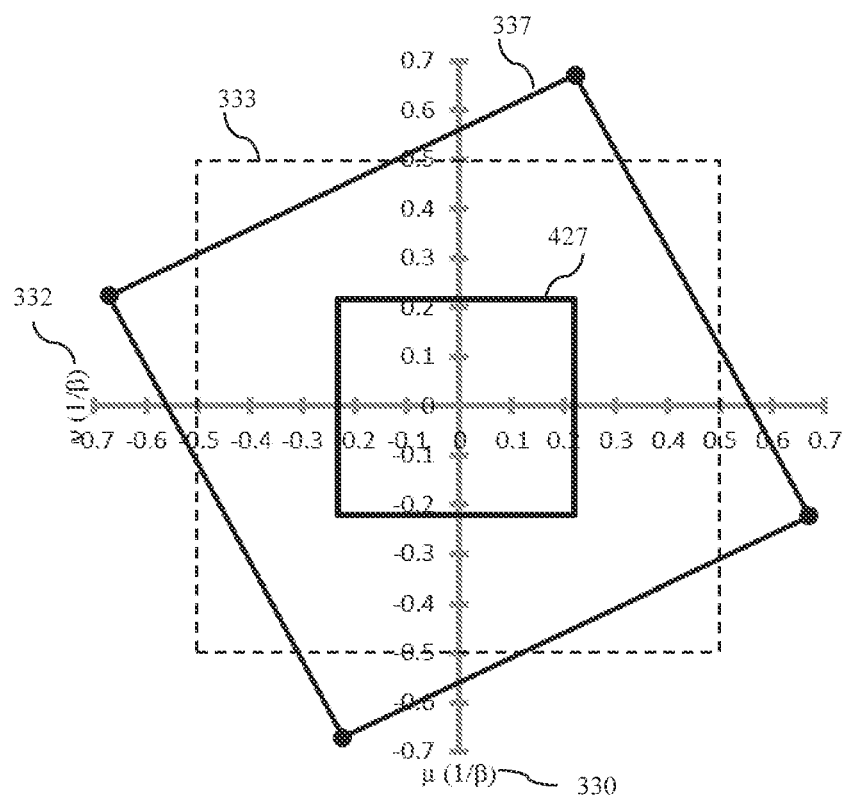
FIG. 36 is a graph illustrating the Nyquist boundary of a five view window spatially multiplexed autostereoscopic display comprising a 45 degrees lens orientation, in accordance with the present disclosure.

FIG. 36 is a graph illustrating the Nyquist boundary of a five view window spatially multiplexed autostereoscopic display comprising a 45 degrees lens orientation, in accordance with the present disclosure. Thus boundary 427 is provided in 3D mode of operation that is advantageously suitable for text and other images that benefit from horizontal and vertical edges. The boundary 337 of the underlying spatial light modulator is tilted with respect to the horizontal and vertical axes of the SLM 505 and thus the full 2D image may be somewhat degraded in a system in which the lens array 500 is switchable to a 2D state.

Figure 37:
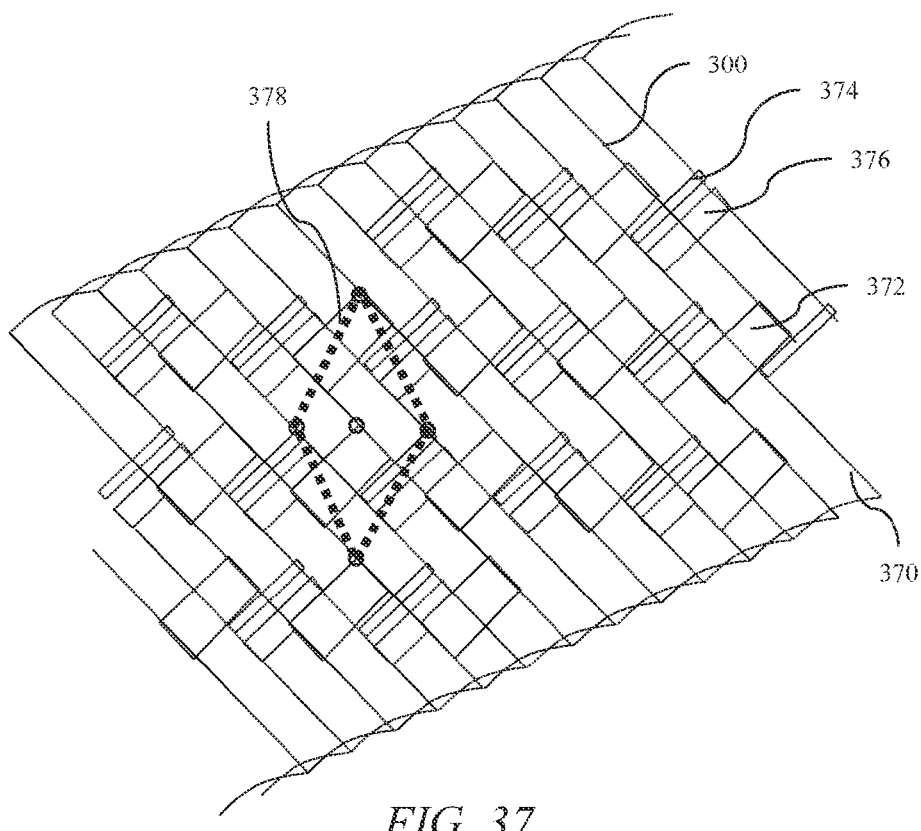
FIG. 37 is a schematic diagram illustrating in front view the 3D pixel appearance of a ten view window switching autostereoscopic display comprising a 45 degrees lens orientation, in accordance with the present disclosure.
Figure 38:
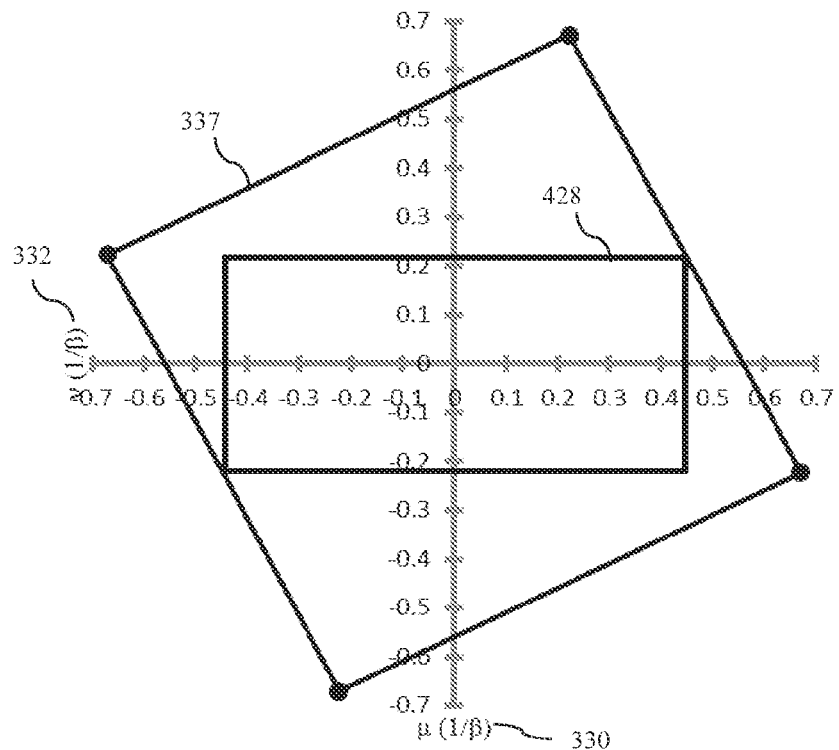
FIG. 38 is a graph illustrating the Nyquist boundary of a ten view window switching autostereoscopic display comprising a 45 degrees lens orientation, in accordance with the present disclosure.

FIG. 37 is a schematic diagram illustrating a front view of the 3D pixel appearance of a ten view window switching autostereoscopic display comprising a 45 degrees lens orientation, wherein the pixels and lens arrays have been rotated anticlockwise by 26.6 degrees. Unit cell 378 of green pixels provides columns and rows of pixels. The axes 370 of the lens arrays are inclined at 45 degrees that delivers optical windows at 45 degrees and are thus suitable for landscape and portrait observer tracking FIG. 38 is a graph illustrating the Nyquist boundary of a ten view window switching autostereoscopic display comprising a 45 degrees lens orientation. The boundary 428 is provided with a horizontal orientation so that vertical and horizontal edges are well reproduced. The horizontal resolution is 89% of the SLM2 horizontal resolution, while the vertical resolution is 45% of SLM 2 vertical resolution. Advantageously, the area bounded by the boundary 428 is 40% of the base panel; such a boundary may be suitable for providing 2D and 3D appearance without viewing the base SLM 505 directly, matching image quality in 2D and 3D modes while achieving high quality text reproduction for example. Such a distribution of resolution is particularly advantageous for stereoscopic display because the disparity information is coded laterally, and thus the depth resolution will be optimized, even though the display can achieve ten separate windows with low cross talk for observer tracking. Further, the green pixels have red-blue rosettes so that the color pixel appearance will be well suited to natural image display. Further, the red and blue pixels will also be arranged in vertical stripes.

Figure 39:
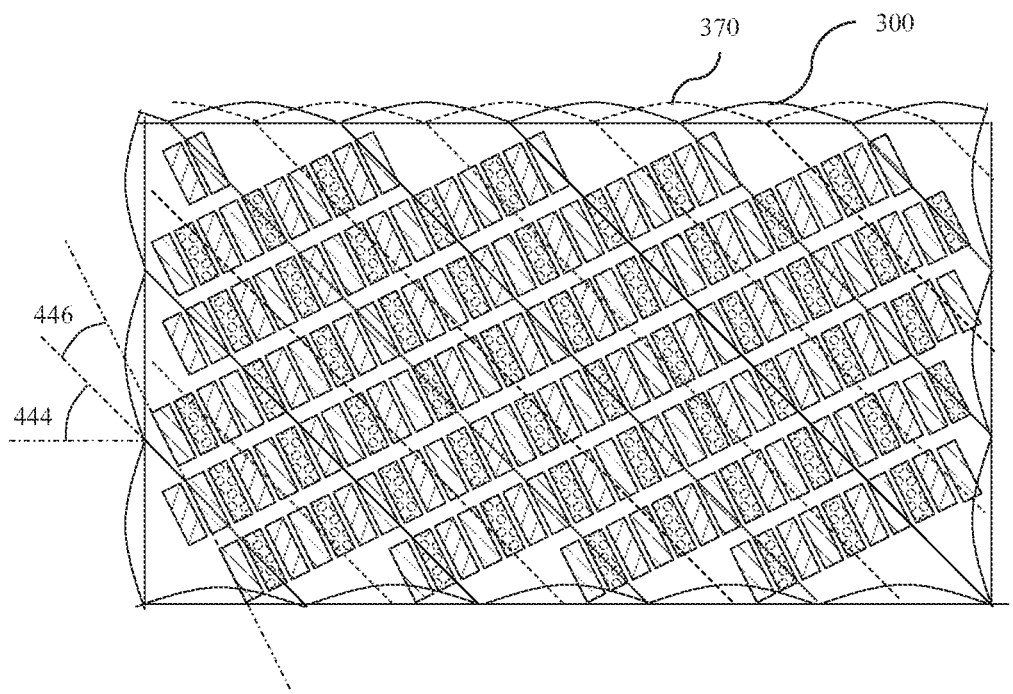
FIG. 39 is a schematic diagram illustrating the front view the pixel arrangement for a window switching autostereoscopic display comprising lenses inclined at 45 degrees, in accordance with the present disclosure.

FIG. 39 is a schematic diagram illustrating the front view of the pixel arrangement for a window switching autostereoscopic display comprising lenses inclined at an angle 444 of 45 degrees to the horizontal. The pixel orientation 446 with respect to the lens axis is set as 18.4 degrees, as described previously. Thus the lens arrangement is arranged to switch between positions of arrays 300 and 370. Such a display can achieve landscape and portrait operation with improved image reproduction compared to the arrangement of FIG. 34 for example.

Figure 40A:
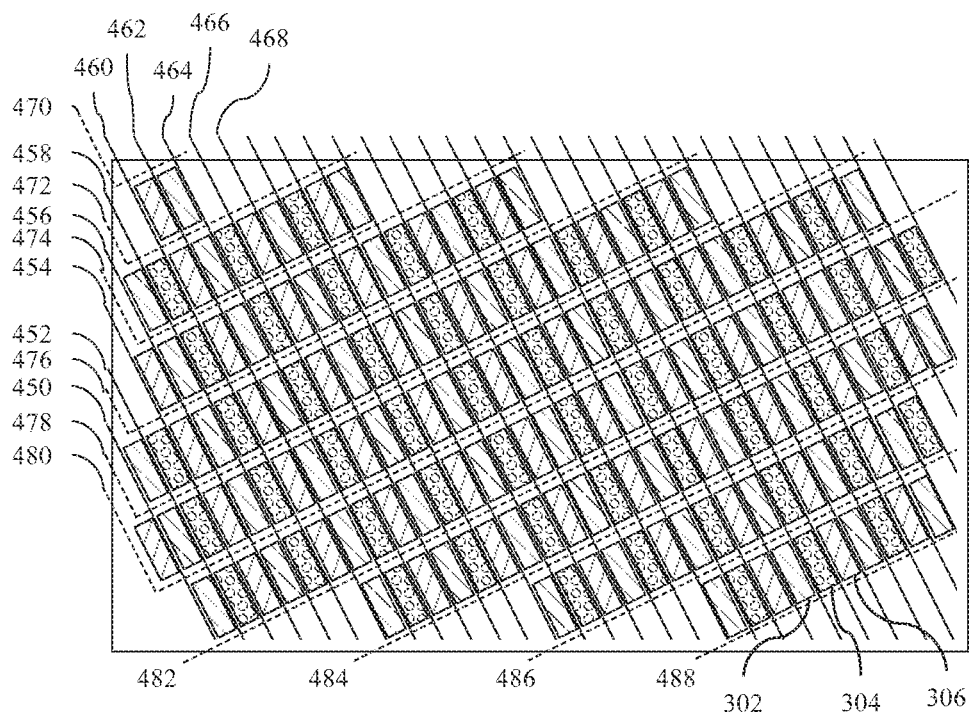
FIG. 40A is a schematic diagram illustrating an electrode arrangement for an inclined pixel spatial light modulator, in accordance with the present disclosure.

FIG. 40A is a schematic diagram illustrating an electrode arrangement for an inclined pixel spatial light modulator. In a matrix addressed scheme, source electrodes 450, 452 454, 456, 458, 460, 462, 464, 466, 468 are arranged to provide source data, while gate electrodes 470, 472, 474, 476, 478, 480, 482, 484, 486, 488 are arranged to control timing of data driving of respective pixels. Advantageously the inclined array of pixels may be addressed by appropriately placed driver elements as will be described. In this embodiment, it may be advantageous to provide driver chips with mixed source and gate addressing characteristics.

Figure 40B:
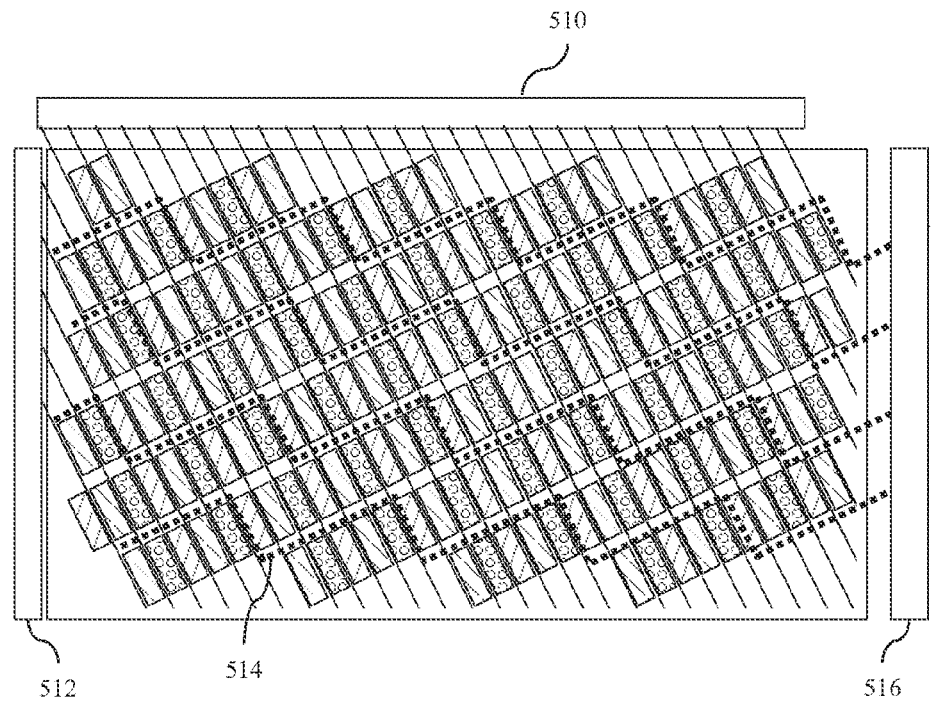
FIG. 40B is a schematic diagram illustrating an electrode arrangement for an inclined pixel spatial light modulator, in accordance with the present disclosure.

FIG. 40B is a schematic diagram illustrating an electrode arrangement for an inclined pixel spatial light modulator. In this embodiment, gate electrodes 514 are provided in a zig-zag arrangement (illustrated in dotted lines) so that separated gate and source electrode driving can be achieved. Thus source drivers 510, 512 are arranged to provide signals to the pixels while gate driver 516 is arranged to provide pixel switching by means of gate electrodes 514. Such an arrangement may achieve reduced light loss as gate drive lines may be routed between image pixels.

Figure 40C:
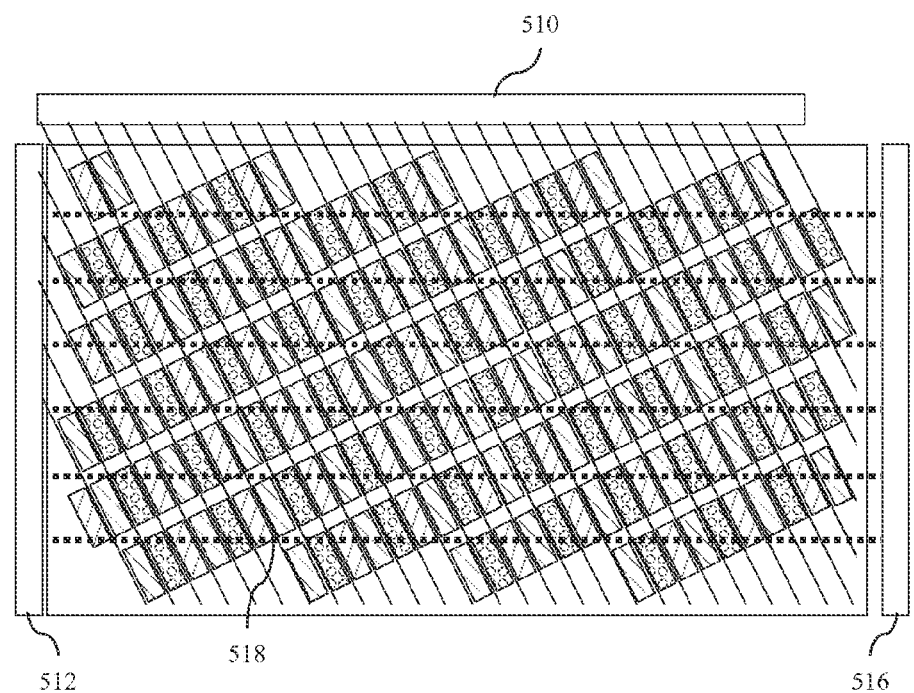
FIG. 40C is a schematic diagram illustrating an electrode arrangement for an inclined pixel spatial light modulator, in accordance with the present disclosure.

FIG. 40C is a schematic diagram illustrating an electrode arrangement for an inclined pixel spatial light modulator. Linear gate electrodes (illustrated in dotted lines) are provided in this embodiment. In this embodiment the gate line 518 length may be reduced by routing directly across the image pixel array. Such a reduction in length may improve switching performance for hybrid spatial and temporally multiplexed displays.

Figure 41:
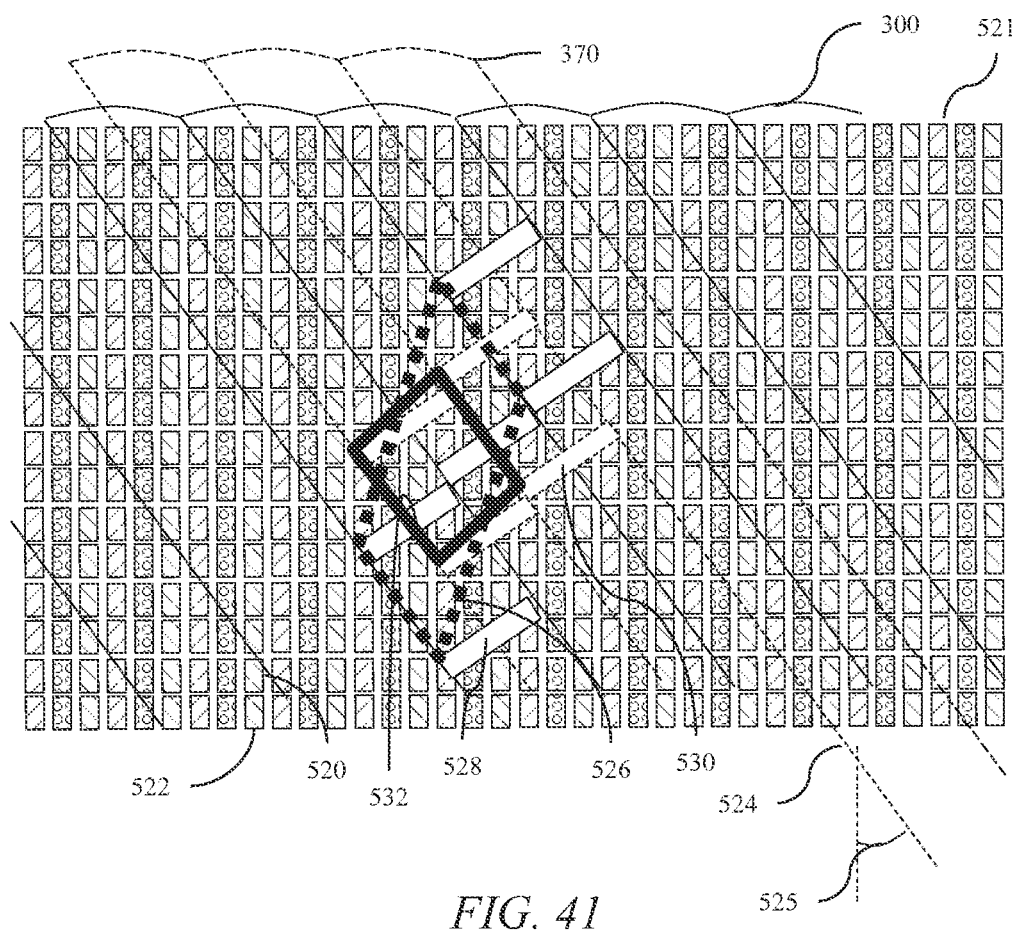
FIG. 41 is a schematic diagram illustrating in front view the 3D pixel appearance of a twenty view window switching autostereoscopic display comprising a 45 degree lens orientation, in accordance with the present disclosure.

FIG. 41 is a schematic diagram illustrating a front view of the 3D pixel appearance of a twenty view window switching autostereoscopic display comprising a 33.6 degree lens orientation. The pixels 522 of SLM 521 are arranged as columns and rows, and in comparison to the pixels 302, 304, 306 of FIG. 11 further sub-divided into two parts to achieve increased vertical resolution. Green pixels 528, 530 from first and second modes advantageously achieve unit cell 526 in a given mode and an integrated unit cell 532 for an observer. With lens axes 524 at an angle 525 of 33.6 degrees angle to the vertical, advantageously the 3D pixel structure provides increased vertical resolution, with inclined windows to achieve landscape and portrait operation. Further such a display can achieve high image quality in 2D mode if the lens functions are removed.

Figure 42:
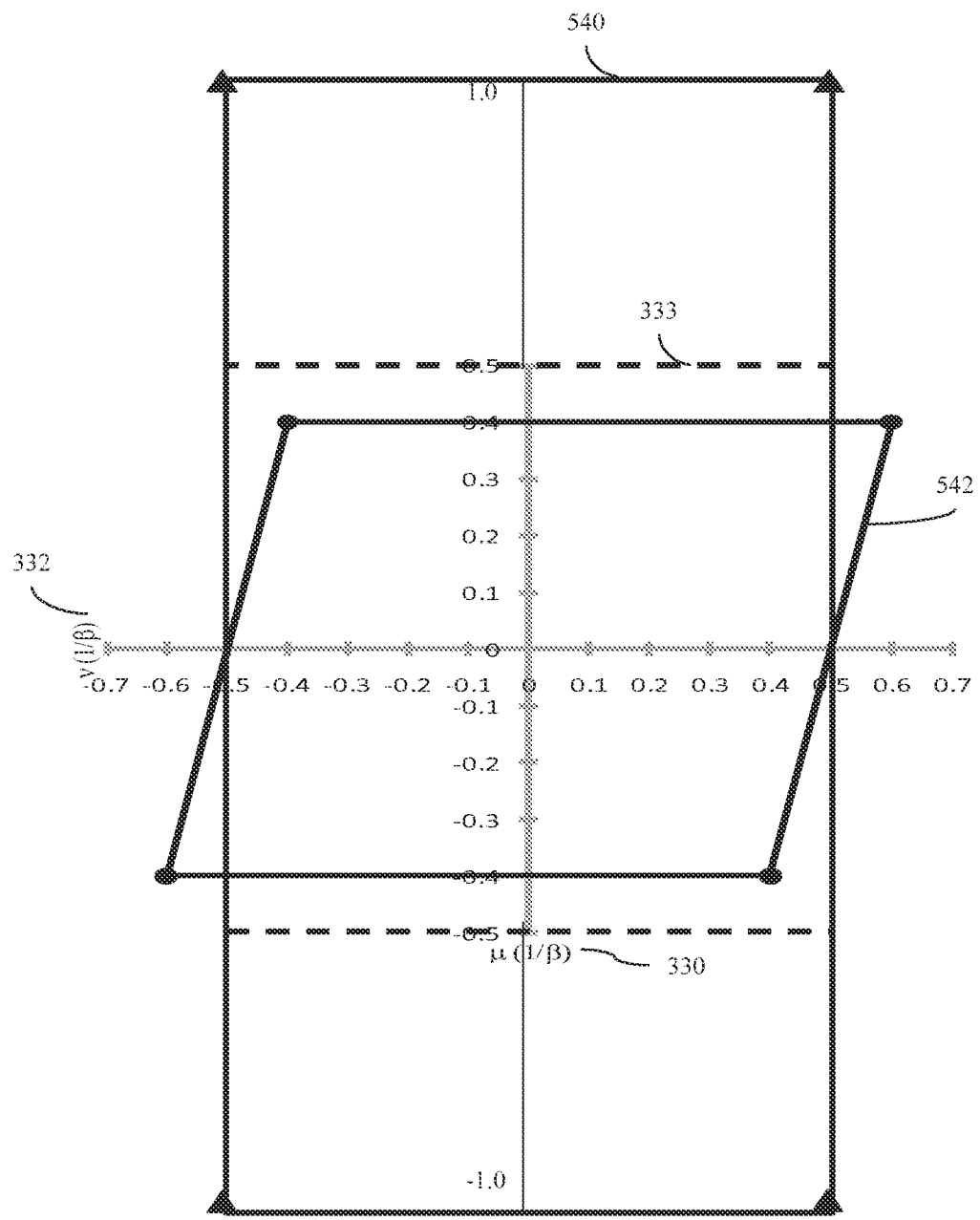
FIG. 42 is a graph illustrating the Nyquist boundary of a twenty view window switching autostereoscopic display comprising a 45 degree lens orientation, in accordance with the present disclosure.

FIG. 42 is a graph illustrating the Nyquist boundary of a twenty view window switching autostereoscopic display comprising a 33.6 degree lens orientation. The nominal horizontal resolution is the same as the base panel boundary 540, while the vertical resolution shown by boundary 542 is 80% of the non-divided base panel (such as those comprising pixels 302, 304, 306 and shown by boundary 333). In 3D mode, a small amount of stagger will be present for vertical lines, while horizontal lines will advantageously be reproduced with high fidelity. Such a display may advantageously be suitable for landscape and portrait operation with high image quality.

The display apparatuses described above employ an SLM 2 having pixels arranged in an aperture having a rectangular shape. However, this shape is merely an example and in general the shape could be any shape having to any shape having two perpendicular axes of mirror symmetry, including without limitation rectangles with rounded corners or circles or ellipses. For example, a circular or ellipsoid shape might be used in a display for a watch. Similar considerations for viewing in different orientations apply to any such shape.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device for an autostereoscopic display apparatus, the display device comprising:
   a spatial light modulator comprising an array of pixels;
   a first lens array and a second lens array, each aligned with the spatial light modulator and operable to direct light from spatially multiplexed sub-arrays of pixels into an array of at least three optical windows in a window plane, the optical windows of the first lens array being spatially offset from the optical windows of the second lens array; and
   a lens switching arrangement capable of causing the lens arrays to switch between operation in a first mode in which the first lens array operates and the second lens array has substantially no optical effect and a second mode in which the first lens array has substantially no optical effect and the second lens array operates.

2. A display device according to claim 1, wherein each array of optical windows comprises at least five optical windows.

3. A display device according to claim 1, wherein the optical windows of the first lens array have the same pitch as the optical windows of the second lens array and the optical windows of the first lens array are offset from the optical windows of the second lens array by half that pitch.

4. A display device according to claim 1, wherein
   the first and second lens arrays comprise respective active birefringent lens arrays, each switchable between a first state wherein the lens arrays direct light into respective arrays of at least three optical windows in a window plane and a second state in which the lens arrays have substantially no optical effect, and
   the lens switching arrangement is arranged to switch the first lens array into its first state and the second lens array into its second state in said first mode, and to switch the first lens array into its second state and the second lens array into its first state in said second mode.

5. A display device according to claim 1, wherein the spatial light modulator is an emissive, transmissive or reflective spatial light modulator.

6. A display device according to claim 1, wherein the array of pixels are arranged in an aperture with a shape having two perpendicular axes of mirror symmetry and the first lens array and the second lens array are each arranged to direct light from spatially multiplexed sub-arrays of pixels into respective optical windows in a window plane having different positions and extending at an angle in a range from 25 to 65 degrees relative to one of said axes of the shape of the aperture.

7. A display device according to claim 6, wherein said range is from 30 to 60 degrees, from 35 to 55 degrees, or from 40 to 50 degrees.

8. A display device according to claim 6, wherein the pixels are arrayed in directions that at a non-zero angle to the direction in which the optical windows extend and at a non-zero angle to said axis of the shape of the aperture.

9. A display device according to claim 1, wherein at least one of the lens arrays comprises a passive birefringent lens array.

10. A display device according to claim 9, wherein
    the first and second lens arrays comprise respective passive birefringent lens arrays arranged to direct light of perpendicular polarisation components into respective arrays of at least three optical windows in a window plane; and
    the lens switching arrangement comprises a polarization switch operable to switch the polarisation of light output from the display device between polarisations corresponding to said perpendicular polarisation components.

11. A display device according to claim 9, wherein the passive birefringent lens array comprises a surface relief birefringent lens array.

12. A display device according to claim 9, wherein the passive birefringent lens comprises a graded index birefringent lens array.

13. An autostereoscopic display apparatus comprising:
    a display device for an autostereoscopic display apparatus comprising:
       a spatial light modulator comprising an array of pixels;
       a first lens array and a second lens array, each aligned with the spatial light modulator and operable to direct light from spatially multiplexed sub-arrays of pixels into an array of at least three optical windows in a window plane, the optical windows of the first lens array being spatially offset from the optical windows of the second lens array; and
       a lens switching arrangement capable of causing the lens arrays to switch between operation in a first mode in which the first lens array operates and the second lens array has substantially no optical effect and a second mode in which the first lens array has substantially no optical effect and the second lens array operates,
       wherein the array of pixels are arranged in an aperture with a shape having two perpendicular axes of mirror symmetry and the first lens array and the second lens array are each arranged to direct light from spatially multiplexed sub-arrays of pixels into respective optical windows in a window plane having different positions and extending at an angle in a range from 25 to 65 degrees relative to one of said axes of the shape of the aperture.

14. An autostereoscopic display apparatus according to claim 13, wherein said shape of the aperture is rectangular.

15. An autostereoscopic display apparatus according to claim 13 comprising:
    a sensor system arranged to detect the position of an observer relative to the display device and to detect the orientation of the view of the observer; and
    a control system arranged to control the lens switching arrangement to switch the lens arrays to cause temporally multiplexed operation in the first mode and second mode and synchronously to cause the display device to display left and right eye images on the sub-arrays of pixels so as to direct the left and right eye images to optical windows corresponding to the left and right eyes of the observer, in dependence on the detected position of the observer and on the detected orientation of the view.

16. An autostereoscopic display apparatus according to claim 15, wherein the sensor system comprises an observer tracking system arranged to detect the position of an observer in two dimensions across the display device and an orientation sensor arranged to detect the orientation of the view of the observer.

17. An observer tracking autostereoscopic display comprising:
a first lens array and a second lens array;
a lens switching apparatus arranged to switch the first lens array to operate in a first phase and the second lens array to operate in a second phase;
a spatial light modulator arranged to display image data in first and second phases and comprising an array of pixels aligned with the first and second lens arrays;
wherein the first lens array cooperates with the array of pixels to produce an array of at least three viewing windows, and the second lens array cooperates with the array of pixels to produce an array of at least three viewing windows; and
wherein the first and second arrays of viewing windows are spatially interlaced.

18. The observer tracking autostereoscopic display according to claim 17, wherein each array of viewing windows comprises five viewing windows.

19. The observer tracking autostereoscopic display according to claim 17, wherein the lens arrays are inclined at 45 degrees to the horizontal.

20. The observer tracking autostereoscopic display according to claim 17, wherein the lens switching apparatus comprises a polarization switch.

21. The observer tracking autostereoscopic display according to claim 17, wherein the lens switching apparatus comprises at least one active birefringent lens.

22. The observer tracking autostereoscopic display according to claim 17, further comprising an observer tracking system.

23. The observer tracking autostereoscopic display according to claim 17, wherein the array of pixels is arranged as columns and rows.

24. The observer tracking autostereoscopic display according to claim 23, wherein the array of pixels is inclined at 26.6 degrees to the vertical and at 18.4 degrees to the lens arrays.

25. The observer tracking autostereoscopic display according to claim 17, wherein at least one of the lens arrays comprises at least one passive birefringent lens array.

26. The observer tracking autostereoscopic display according to claim 25, wherein the passive birefringent lens comprises a surface relief birefringent lens array.

27. The observer tracking autostereoscopic display according to claim 25, wherein the passive birefringent lens comprises a graded index birefringent lens array.

28. An autostereoscopic display apparatus, comprising:
a display device comprising an array of pixels arranged in an aperture with a shape having two perpendicular axes of mirror symmetry and a parallax element arranged to direct light from spatially multiplexed sub-arrays of pixels into respective optical windows in a window plane having different positions and extending at an angle in a range from 25 to 65 degrees relative to an axis of the shape of the aperture;
a sensor system arranged to detect the position of an observer in two dimensions across the display device and the orientation of the view of the observer; and
a control system arranged to control the display device to display left and right eye images on the sub-arrays of pixels so as to direct the left and right eye images to optical windows corresponding to the left and right eyes of the observer, in dependence on the detected position of the observer and on the detected orientation of the view.

29. An autostereoscopic display apparatus according to claim 28, wherein said range is from 25 to 65 degrees, from 35 to 55 degrees or from 40 to 50 degrees.

30. An autostereoscopic display apparatus according to claim 28, wherein the sensor system comprises an observer tracking system arranged to detect the position of an observer in two dimensions across the display device and an orientation sensor arranged to detect the orientation of the view of the observer.

31. An autostereoscopic display apparatus according to claim 28, wherein
the display device is arranged to be operable in a first mode in which light is directed from spatially multiplexed sub-arrays of pixels into a first array of at least three optical windows in a window plane and in a second mode in which light is directed from spatially multiplexed sub-arrays of pixels into a second array of at least three optical windows in a window plane that are spatially offset from the first array of at least three optical windows, and
the control system is arranged to control the display device to cause temporally multiplexed operation in the first mode and second mode and synchronously to cause the display device to display said left and right eye images on the sub-arrays of pixels.

32. An autostereoscopic display apparatus comprising:
a display device for an autostereoscopic display apparatus comprising:
a spatial light modulator comprising an array of pixels;
a first lens array and a second lens array, each aligned with the spatial light modulator and operable to direct light from spatially multiplexed sub-arrays of pixels into an array of at least three optical windows in a window plane, the optical windows of the first lens array being spatially offset from the optical windows of the second lens array; and
a lens switching arrangement capable of causing the lens arrays to switch between operation in a first mode in which the first lens array operates and the second lens array has substantially no optical effect and a second mode in which the first lens array has substantially no optical effect and the second lens array operates;
a sensor system arranged to detect the position of an observer relative to the display device; and
a control system arranged to control the lens switching arrangement to switch the lens arrays to cause temporally multiplexed operation in the first mode and second mode and synchronously to cause the display device to display left and right eye images on the sub-arrays of pixels so as to direct the left and right eye images to optical windows corresponding to the left and right eyes of the observer, in dependence on the detected position of the observer.

* * * * *